United States Patent
Morikawa

(10) Patent No.: US 12,177,409 B2
(45) Date of Patent: Dec. 24, 2024

(54) PRINTING DEVICE PERFORMING CALIBRATION PROCESS TO CALIBRATE MEASURING MEMBER AND THEREAFTER COLOR MEASUREMENT PROCESS OF USER SPECIFIED COLOR PATCHES

(71) Applicant: BROTHER KOGYO KABUSHIKI KAISHA, Nagoya (JP)

(72) Inventor: Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/357,267

(22) Filed: Jul. 24, 2023

(65) Prior Publication Data

US 2024/0040063 A1 Feb. 1, 2024

(51) Int. Cl.
H04N 1/60 (2006.01)

(52) U.S. Cl.
CPC ..... *H04N 1/6033* (2013.01); *G06K 2215/101* (2013.01)

(58) Field of Classification Search
CPC .................................................. H04N 1/6033
See application file for complete search history.

(56) References Cited

U.S. PATENT DOCUMENTS

| | | | | |
|---|---|---|---|---|
| 7,006,246 B1* | 2/2006 | Nakajima | .......... | H04N 1/00002 358/1.9 |
| 2007/0229870 A1* | 10/2007 | Doi | ....................... | H04N 1/6033 358/1.9 |
| 2014/0185114 A1* | 7/2014 | Takemura | ................ | H04N 1/60 358/504 |

FOREIGN PATENT DOCUMENTS

| JP | 2008200894 A | 9/2008 |
|---|---|---|
| JP | 2010157920 A | 7/2010 |

* cited by examiner

*Primary Examiner* — Barbara D Reinier
(74) *Attorney, Agent, or Firm* — Scully, Scott, Murphy & Presser, PC

(57) ABSTRACT

A printing device prints a patch chart including a plurality of first patches having a predetermined color and one or more second patches having a user specified color. A measuring member measures a color of a patch. The patch chart includes a plurality of patch columns having two or more patches among the plurality of patches arranged linearly. In a case that a patch column of the plurality of patch columns includes a second patch of the plurality of second patches, a controller performs a calibration process to calibrate the measuring member by controlling the measuring member to measure a color of a reference; and after the calibration process is completed, a color measurement process for a patch included in the patch column including the second patch, the color measurement process for the patch being to control the measuring member to measure a color of the patch.

10 Claims, 19 Drawing Sheets

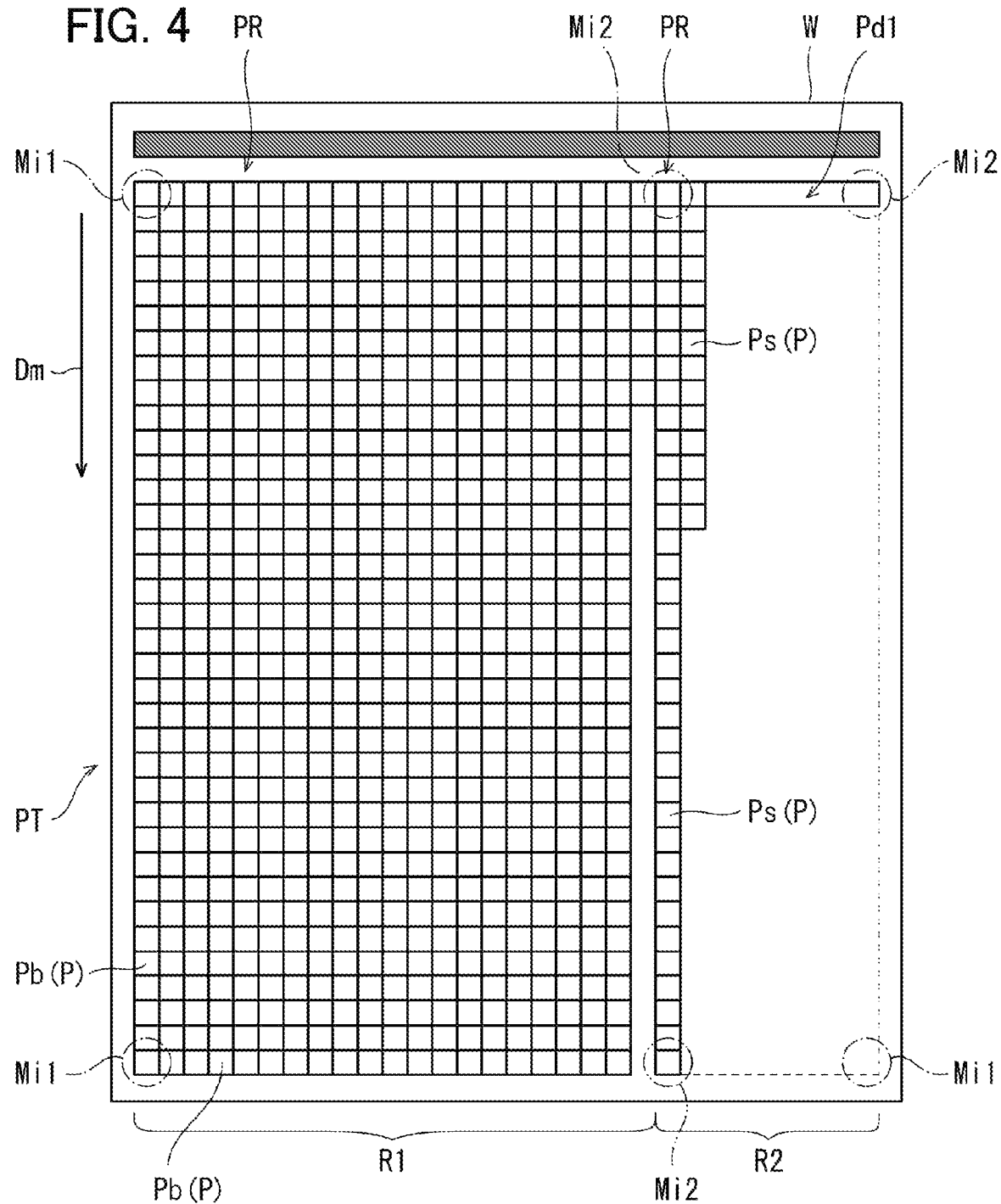
FIG. 4
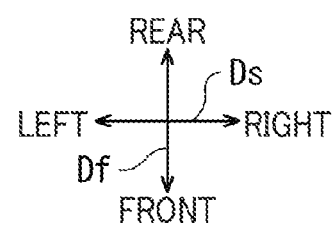

FIG. 5
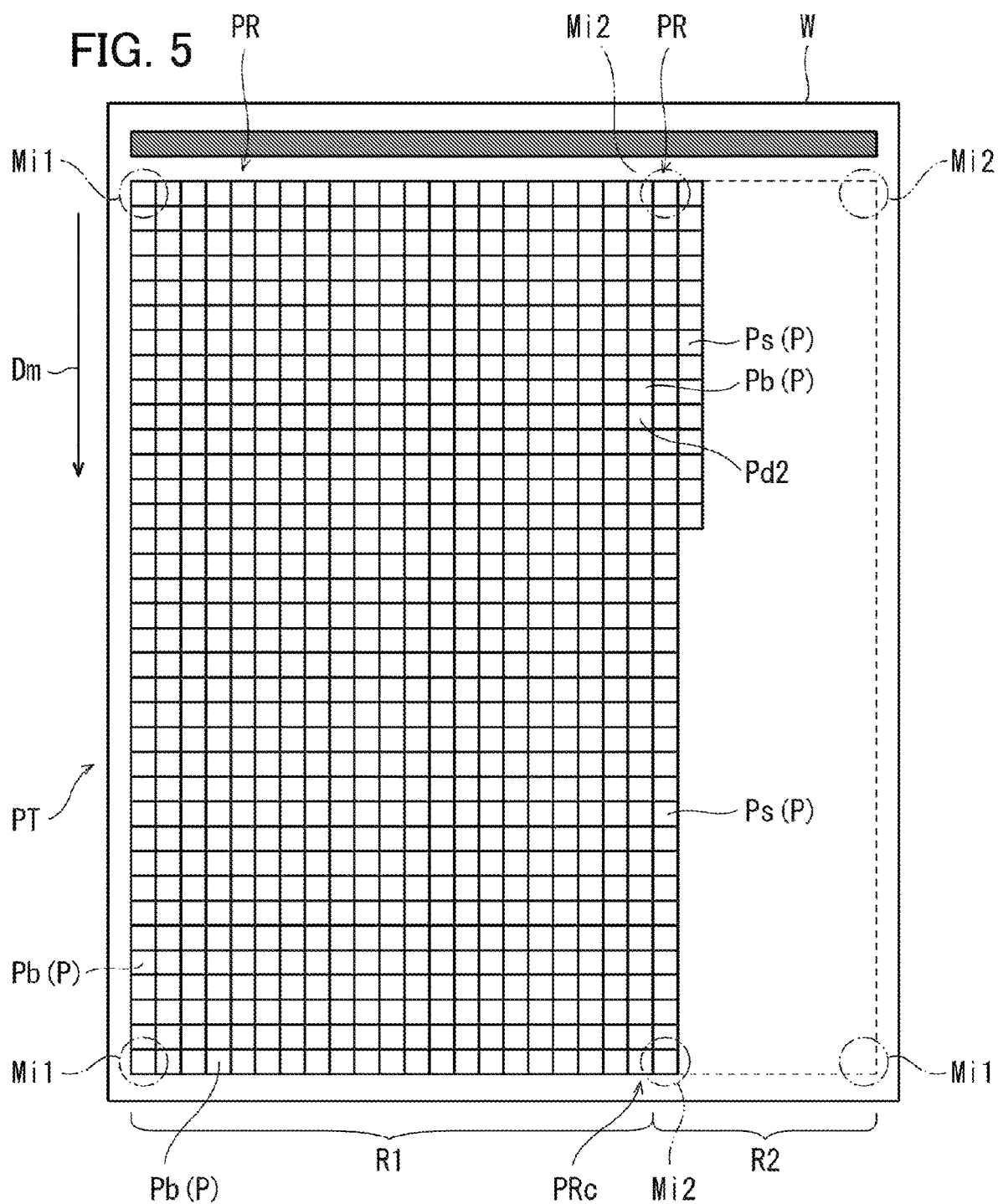
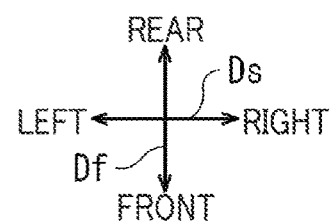

| No. | SECOND PATCH | THE NUMBER OF PATCHES | STARTING POSITION x | STARTING POSITION y | ENDING POSITION x | ENDING POSITION y |
|---|---|---|---|---|---|---|
| 1 | ABSENT | 36 | 10 | 10 | 13 | 100 |
| 2 | ABSENT | 36 | 16 | 10 | 20 | 100 |
| ⋮ | ⋮ | ⋮ | ⋮ | ⋮ | ⋮ | ⋮ |
| 22 | PRESENT | 36 | 125 | 12 | 129 | 102 |
| ⋮ | ⋮ | ⋮ | ⋮ | ⋮ | ⋮ | ⋮ |

| No. | TYPE | POSITION | COLOR VALUE | | | MEASURED COLOR VALUE | | |
|---|---|---|---|---|---|---|---|---|
| | | | R | G | B | L | a | b |
| 1 | FIRST PATCH | 1ST COLUMN 1ST ROW | 0 | 0 | 0 | | | |
| 2 | FIRST PATCH | 1ST COLUMN 2ND ROW | 7 | 0 | 0 | | | |
| ⋮ | ⋮ | ⋮ | ⋮ | ⋮ | ⋮ | ⋮ | ⋮ | ⋮ |
| 730 | SECOND PATCH | 22-TH COLUMN 1ST ROW | 255 | 160 | 32 | | | |
| 731 | SECOND PATCH | 22-TH COLUMN 2ND ROW | 255 | 176 | 80 | | | |
| ⋮ | ⋮ | ⋮ | ⋮ | ⋮ | ⋮ | ⋮ | ⋮ | ⋮ |

FIG. 8
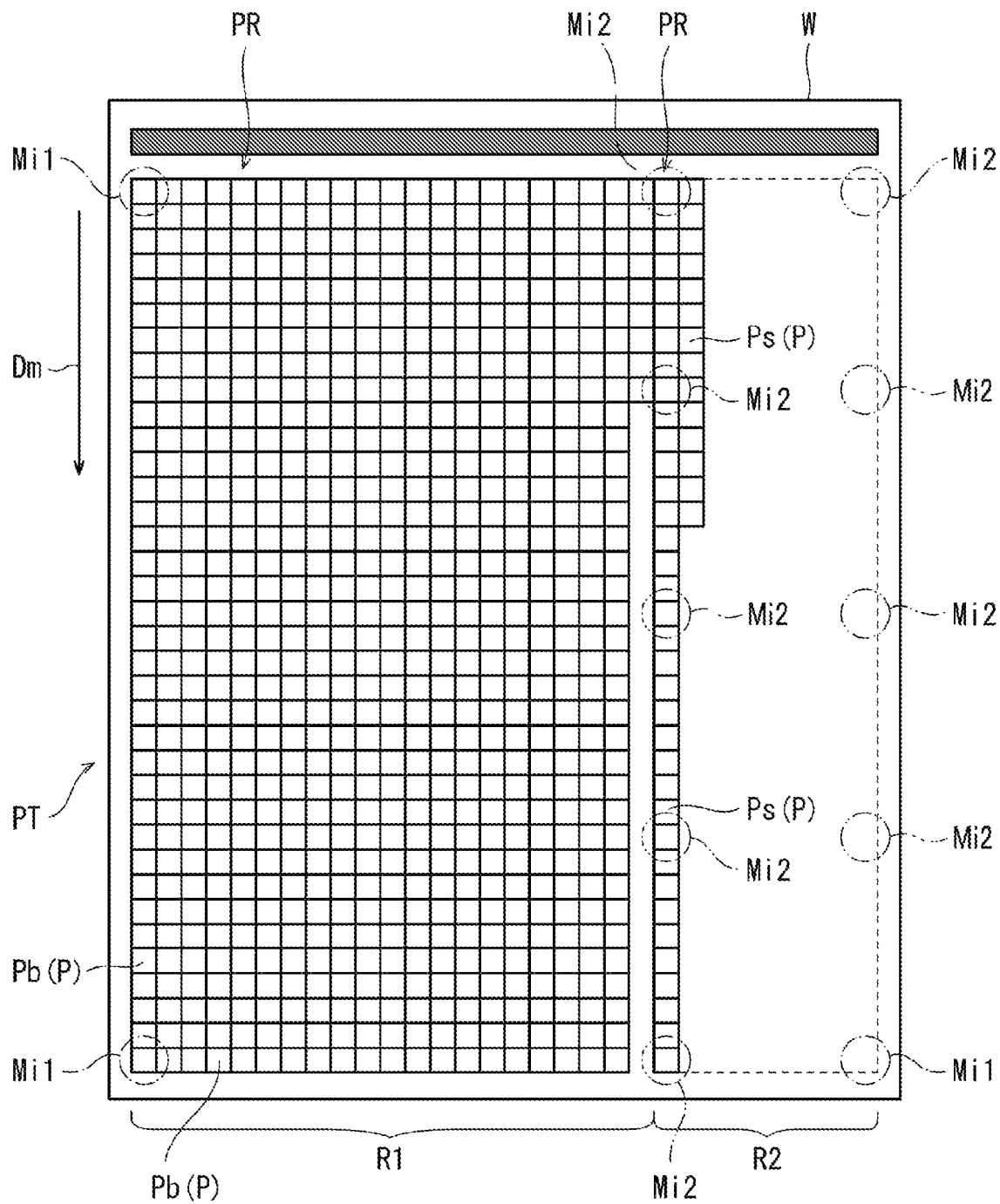
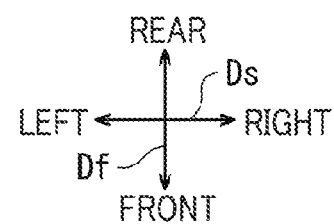

FIG. 14
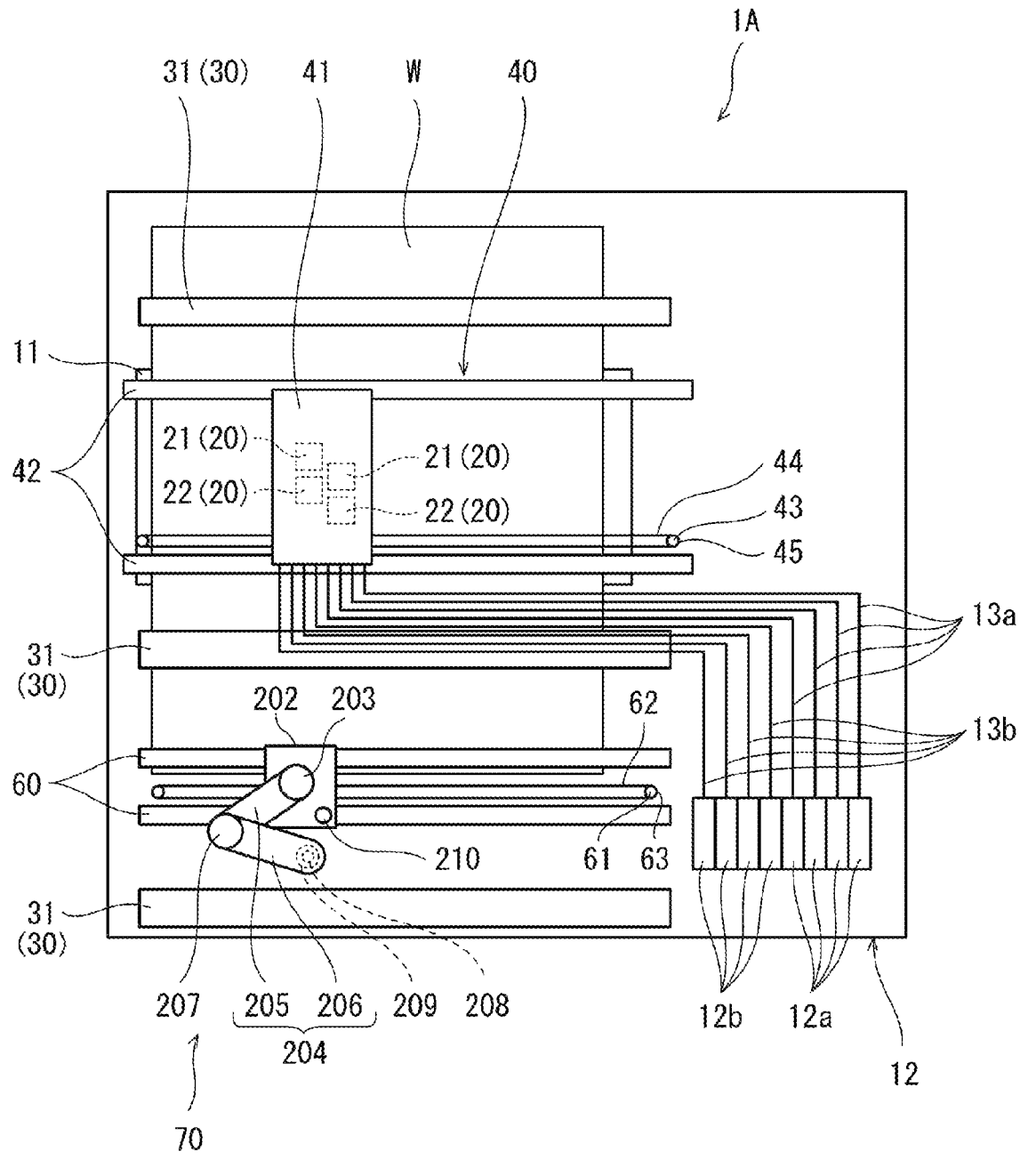
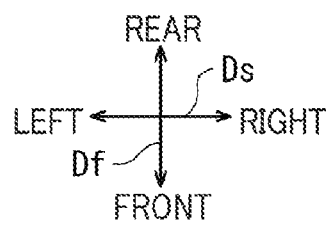

FIG. 16
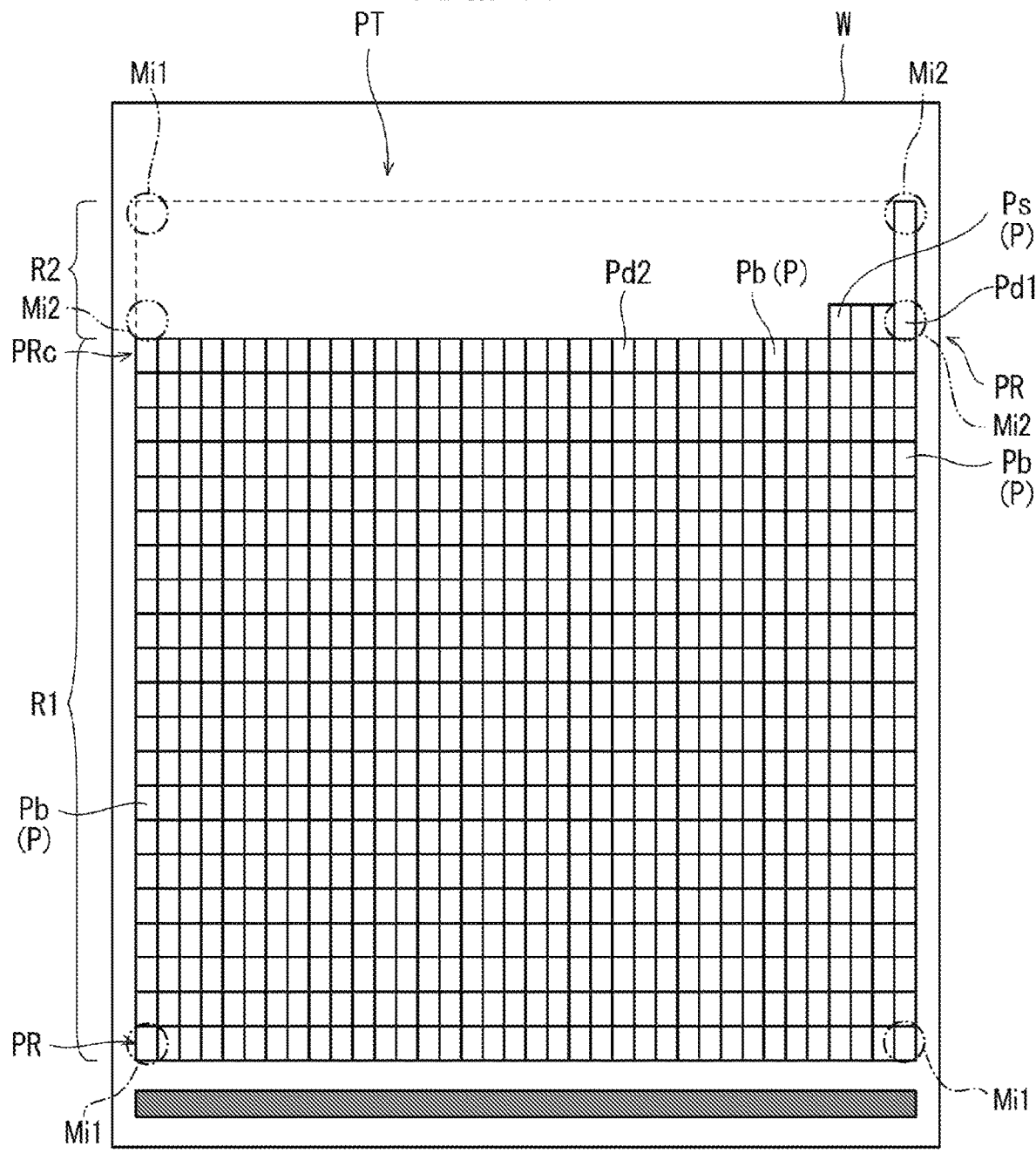
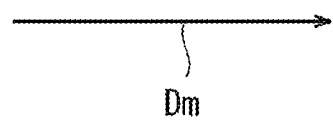
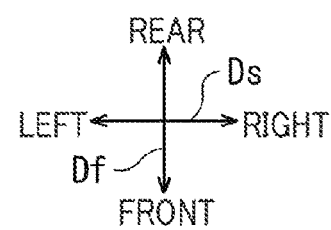

FIG. 17
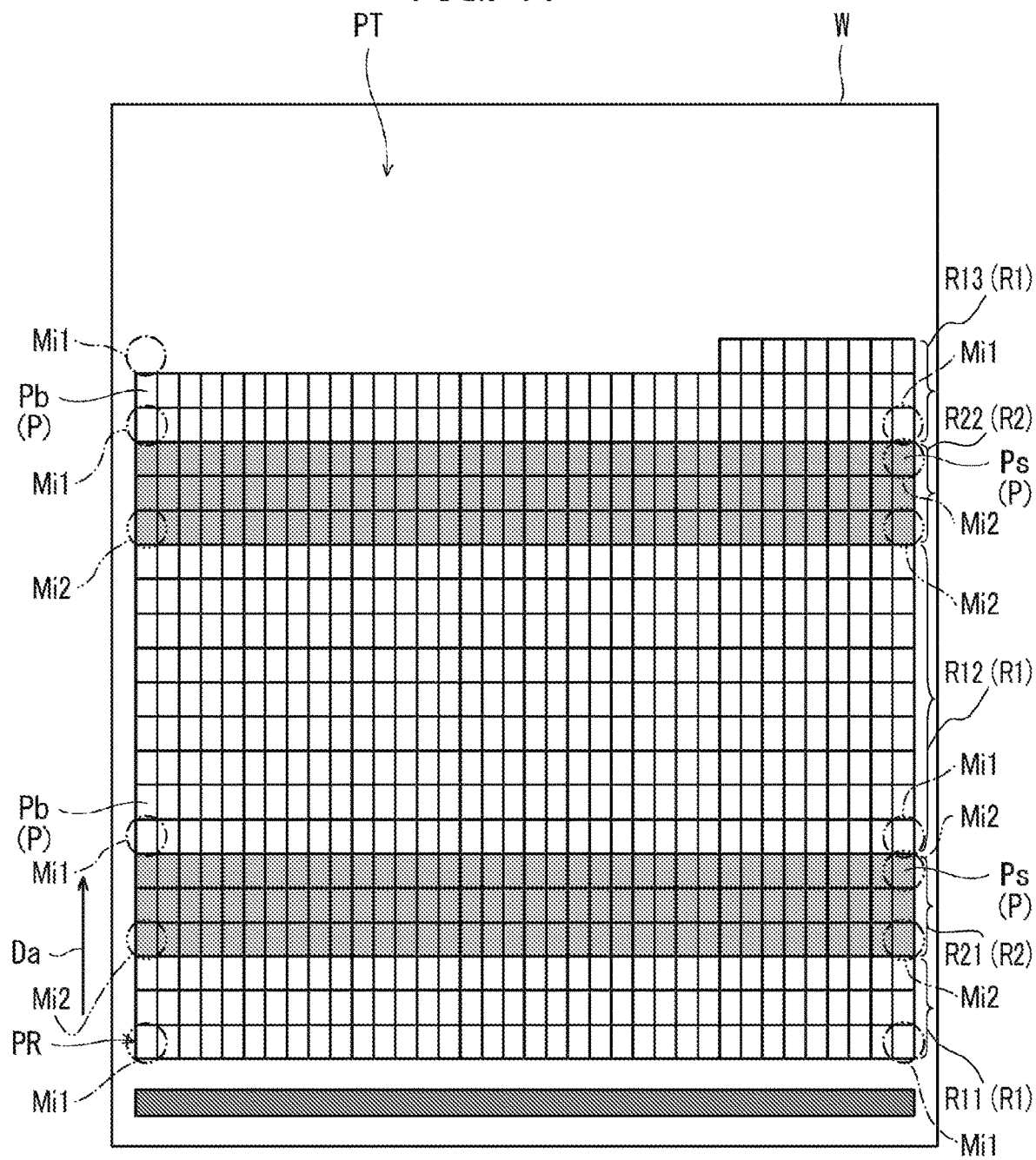
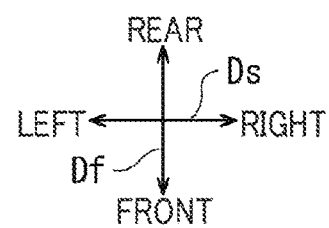

PRINTING DEVICE PERFORMING CALIBRATION PROCESS TO CALIBRATE MEASURING MEMBER AND THEREAFTER COLOR MEASUREMENT PROCESS OF USER SPECIFIED COLOR PATCHES

REFERENCE TO RELATED APPLICATIONS

This application claims priority from Japanese Patent Application No. 2022-121576 filed on Jul. 29, 2022. The entire content of the priority application is incorporated herein by reference.

BACKGROUND ART

An information processing device known in the art is one example of a conventional colorimetry system for measuring colors in printed matter. The conventional information processing device extracts all colors represented by target data to be printed and acquires the occupancy ratio of each color in the printing area. The information processing device then generates data for calibration patch images based on these occupancy ratios and controls a printer to print the calibration patch images. Next, the information processing device uses a colorimeter to measure the colors of the printed calibration patch images and calibrates the image data for the target image based on this colorimetric data.

DESCRIPTION

The conventional information processing device described above measures printed calibration patches with a colorimeter all in the same manner and calibrates the image data to be printed on the basis of this colorimetric data. However, using the same method to measure colors of all calibration patch images with the colorimeter may decrease the accuracy of color measurements, resulting in reduced accuracy of color calibration.

In view of the foregoing, it is an object of the present disclosure to provide a printing device, a color measurement method, and a color measurement program capable of improving the accuracy of color calibration.

In order to attain the above and other object, the present disclosure provides a printing device. The printing device includes a print head, a measuring member, and a controller. The print head is configured to print a patch chart on a print medium. The patch chart includes a plurality of patches including a plurality of first patches and one or more second patches. Each first patch has a predetermined color. Each second patch has a user specified color. The measuring member is configured to measure a color of a patch. The patch chart includes a plurality of patch columns. In each patch column two or more patches among the plurality of patches are arranged linearly. The controller is configured to perform: in a case that a patch column of the plurality of patch columns includes a second patch of the plurality of second patches: a calibration process to calibrate the measuring member by controlling the measuring member to measure a color of a reference; and after the calibration process is completed, a color measurement process for a patch included in the patch column including the second patch, the color measurement process for the patch being to control the measuring member to measure a color of the patch.

According to another aspect, the disclosure provides a method for measuring colors of a plurality of patches included in a patch chart. The plurality of patches includes a plurality of first patches and one or more second patches. Each first patch has a predetermined color. Each second patch has a user specified color. The patch chart includes a plurality of patch columns. In each patch column two or more patches among the plurality of patches are arranged linearly. The method includes, in a case that a patch column of the plurality of patch columns includes a second patch of the plurality of second patches: performing a calibration process to calibrate the measuring member by controlling the measuring member to measure a color of a reference; and performing, after the calibration process is completed, a color measurement process for a patch included in the patch column including the second patch, the color measurement process for the patch being to control the measuring member to measure a color of the patch.

According to still another aspect, the disclosure provides a non-transitory computer readable storage medium storing a set of program instructions for a computer controlling a measuring member configured to measure colors of the patch chart including a plurality of patches including a plurality of first patches and one or more second patches. Each first patch has a predetermined color. Each second patch has a user specified color. The patch chart includes a plurality of patch columns. In each patch column two or more patches among the plurality of patches are arranged linearly. The set of program instructions includes in a case that a patch column of the plurality of patch columns includes a second patch of the plurality of second patches: a calibration process to calibrate the measuring member by controlling the measuring member to measure a color of a reference; and after the calibration process is completed, a color measurement process for a patch included in the patch column including the second patch, the color measurement process for the patch being to control the measuring member to measure a color of the patch.

In the above structures, the accuracy of color measurements can be improved.

FIG. 4 is an explanatory diagram showing an example of a patch chart printed on a print medium.

FIG. 5 is an explanatory diagram showing another example of a patch chart printed on a print medium.

FIG. 6 is an example of a patch column table storing information for each patch column.

FIG. 7 is an example of a table correlating color values of patches with measured color values.

FIG. 8 is an explanatory diagram showing a patch chart and marker images thereof printed on a print medium.

FIG. 14 is a plan view showing a printing device.

FIG. 16 is an explanatory diagram showing another example of a patch chart printed on a print medium.

FIG. 17 is an explanatory diagram showing another example of a patch chart printed on a print medium.

The embodiments of the present disclosure will be described while referring to the accompanied drawings. The following embodiments are just examples and the present invention is not limited to these embodiments. The embodiments can be modified without departing from the scope of the invention. For example, some components and/or steps can be added, and/or deleted.

Figure 1:
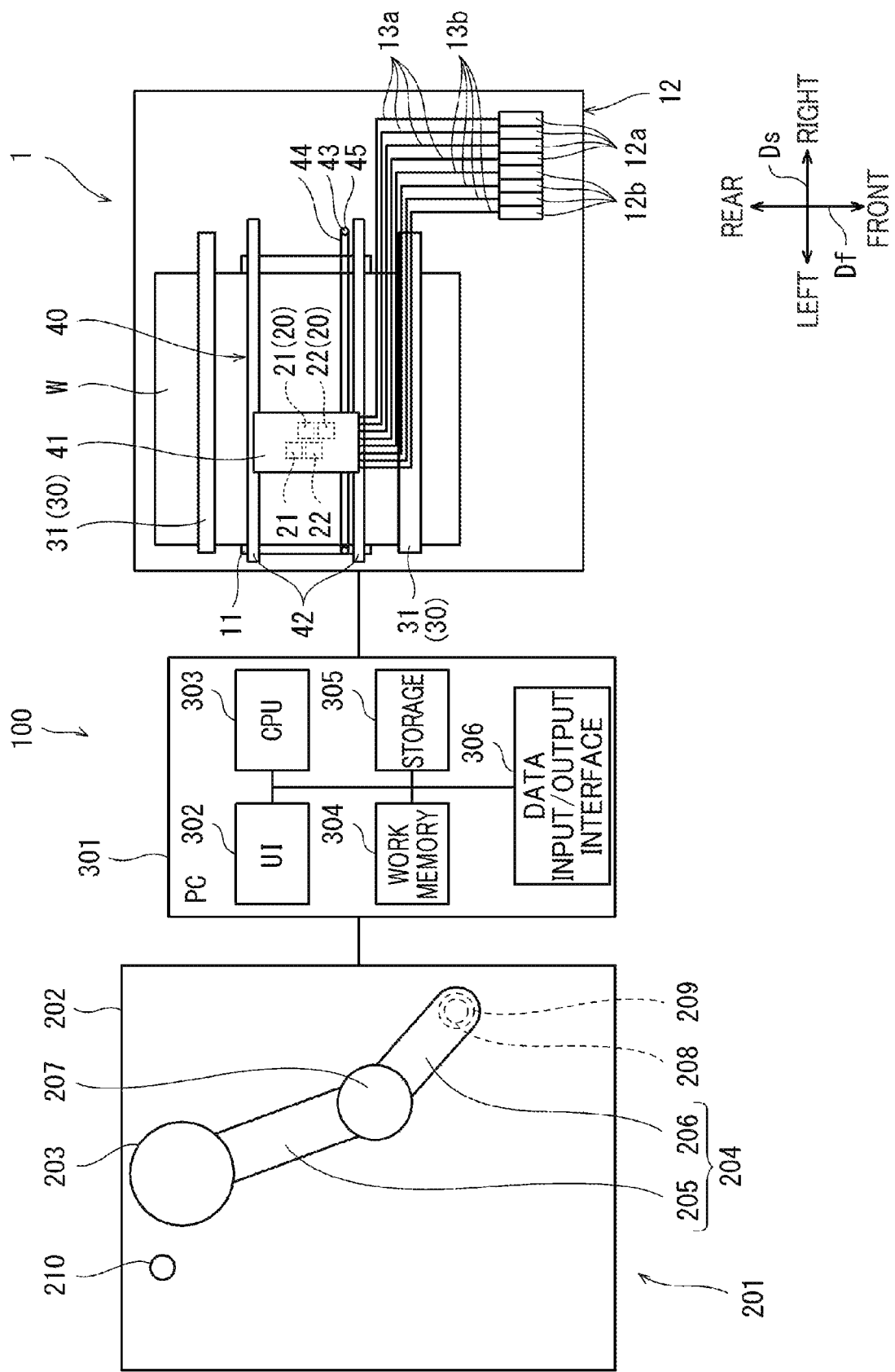
FIG. 1 is a plan view showing a colorimetry system.

FIG. 1 is a plan view showing a colorimetry system 100 according to an embodiment of the present disclosure. In FIG. 1, a first direction Ds, a second direction Df, and a third direction are each orthogonal to the others. In this embodiment, the first direction Ds is the moving direction of a carriage 41 described later, the second direction Df is the conveying direction of a print medium W described later, and the third direction is the up-down direction, for example. Thus, in the following description, Ds will be called the moving direction, Df will be called the conveying direction, and the third direction will be called the up-down direction.

As shown in FIG. 1, the colorimetry system 100 includes a printing device 1, which is an inkjet printer that prints images on print media W such as printing paper; a colorimetric device 201 provided separately from the printing device 1; and a personal computer 301.

The printing device 1 is a serial printer, for example. The printing device 1 is provided with a plurality of ejection heads 20 (see FIG. 2), a platen 11, a plurality of tanks 12, a conveying device 30, and a scanning device 40. However, the printing device 1 may also be configured as a line head printer. In this case, the scanning device 40 is omitted from the printing device 1, and the ejection heads 20 are immobile and have a length in the moving direction Ds greater than the printing area on the print medium W.

The ejection heads 20 use ink in primary colors (described later) to print images on print media W based on image data. The image data includes color values (input color values). In this example, each color value indicates a color and includes component values represented by RGB values in the RGB color space, i.e., as color coordinates in a device-dependent color space. The RGB values express a single color through a combination of a red color value, a green color value, and a blue color value, each of which represents one of a possible 256 gradations (0-255).

The ejection heads 20 print a patch chart PT described later (see FIG. 4) on the print media W. In the present embodiment, the ejection heads 20 correspond to the print engine (or printing unit). The ejection heads 20 include two first ejection heads 21, and two second ejection heads 22, for example. The platen 11 has a flat top surface and defines the distance between a print medium W placed on this top surface and the bottom surface of the ejection heads 20 disposed in opposition to this top surface. The tanks 12 are containers for storing ink. The number of tanks 12 is equal to or greater than the number of ink types. For example, the tanks 12 include four first tanks 12a that store ink in respective ones of the four primary colors, and one or a plurality of second tanks 12b that store ink in special colors.

Examples of primary color inks are cyan ink, yellow ink, magenta ink, and black ink. Special color inks have different colors from the primary colors. Examples of special color inks are red ink, green ink, and blue ink.

The first tanks 12a store ink in the primary colors and communicate with the first ejection heads 21 through first channels 13a. Ink in the primary colors is supplied from the first tanks 12a to the first ejection heads 21 via the first channels 13a. The second tanks 12b communicate with the second ejection heads 22 via second channels 13b. When the second tanks 12b store ink in special colors, the special color inks flow from the second tanks 12b into the second channels 13b, filling the second channels 13b. From the second channels 13b, the special color inks are supplied to the ejection heads 20. Before ink in special colors is stored in the second tanks 12b, the second tanks 12b are filled with a storage solution. The first channels 13a and the second channels 13b are rubber or plastic tubes, for example, which are preferably resistant to kinking.

The conveying device 30 has two sets of conveying rollers 31, and a conveying motor 32 (see FIG. 2), for example. The two sets of conveying rollers 31 are arranged so that the platen 11 is located between the two sets of conveying rollers 31 in the conveying direction Df (front-rear direction). The conveying rollers 31 have axes aligned in the moving direction Ds. In each set, the conveying rollers 31 are aligned in the up-down direction Dz and are configured to nip a print medium W therebetween. One conveying roller 31 in each set is connected to the conveying motor 32. The conveying rollers 31 rotate about their axes when driven by the conveying motor 32 and convey a print medium W over the platen 11 in the conveying direction Df.

The scanning device 40 has a carriage 41, a pair of guide rails 42, a scanning motor 43, and an endless belt 44. The guide rails 42 extend in the moving direction Ds over the platen 11 so that the ejection heads 20 are interposed between the guide rails 42 in the conveying direction Df. The carriage 41 is supported on the guide rails 42 to be movable in the moving direction Ds. The carriage 41 supports the ejection heads 20. The endless belt 44 extends in the moving direction Ds and is attached to the carriage 41. The endless belt 44 is also attached to the scanning motor 43 via a pulley 45. When the scanning motor 43 is driven, the endless belt 44 circulates and the carriage 41 reciprocates in the moving direction Ds along the guide rails 42. In this way, the carriage 41 moves the ejection heads 20 in the moving direction Ds.

The colorimetric device 201 is connected to the personal computer 301 via a network, such as a wired or wireless LAN. The colorimetric device 201 has a base 202 and an arm 204. The base 202 is disposed at a prescribed position in the colorimetry system 100 to a side of the printing device 1, for example. A white reference 210 is provided on the base 202. A color measuring unit 208 described later uses the white reference 210 in a process for adjusting the measurement accuracy for color values (hereinafter also called "calibration process" or "calibration").

The white reference 210 is disposed in an area that the color measuring unit 208 can measure. For example, the white reference 210 is located within the range in the moving direction Ds within which the color measuring unit 208 can be moved by the arm 204 and within the range in the up-down direction within which the color measuring unit 208 oppose and can measure the white reference 210. The white reference 210 has a predetermined color such that the color measuring unit 208 outputs a predetermined color value when the color measuring unit 208 measures a color of the white reference 210 under a specific measuring condition. Here, the predetermined color value has component values expressed by color coordinates in a device-independent color space, such as L*a*b* values. During the calibration process, the color measuring unit 208 is controlled to measure the color of the white reference 210 to acquire a measured color value (or a colorimetric value) having components values represented in the L*a*b*. The predetermined color value for the white reference 210 is then acquired from a storage and, together with the measured color value and color measuring conditions described later, are used to calibrate the measuring precision of the color measuring unit 208.

The arm 204 has a first link 205 and a second link 206, for example. The proximal end of the first link 205 is connected to the base 202 by a first rotary joint 203, for example. The first rotary joint 203 has an actuator, such as a motor, which rotates the arm 204 relative to the base 202 about a central axis aligned in the up-down direction. The proximal end of the second link 206 is connected to the distal end of the first link 205 by a second rotary joint 207. The second rotary joint 207 has an actuator, such as a motor, which rotates the second link 206 relative to the first link 205 about a central axis aligned in the up-down direction. Additionally, the distal end of the second link 206 is connected to the color measuring unit 208 by a prismatic joint 209, for example. The prismatic joint 209 has a linear actuator, such as a motor or solenoid, which moves the color measuring unit 208 up and down relative to the second link 206. With this configuration, the arm 204 can move the color measuring unit 208 three-dimensionally.

The color measuring unit 208 is a spectrophotometer and colorimeter, for example, and has a light-emitting element and a light-receiving element which have respectively the same structures as a light-emitting element 211 (FIG. 15) and a light-receiving element 212 (FIG. 15) described later. The light-emitting element (211) is a light source, such as an illuminant D65, C, or A, and irradiates light onto patches P (see FIG. 4) formed on a print medium W. The light-receiving element (212) receives light irradiated from the light-emitting element (211) and reflected off the patches P. The color measuring unit 208 measures the colors of patches P on the basis of light received by the light-receiving element (212) to acquire measured color values (colorimetric values). Each colorimetric value is expressed as a color value having component values, that is, color coordinates in a device-independent color space such as Lab values in the L*a*b* color space or XYZ values in the XYZ color space.

The personal computer 301 is connected to the printing device 1 and the colorimetric device 201 via a network, such as a wired or wireless LAN. The personal computer 301 is provided with a user interface 302, a CPU 303, a work memory 304, a storage 305, and a data input/output interface 306. The user interface 302 performs processes related to input from the user and displays for the user. The user interface 302 includes input devices such as a keyboard and mouse, and display devices such as a display. The storage 305 is a hard disk, for example. The CPU 303 performs various processes according to programs stored in the storage 305. The work memory 304 is used as a work area when the CPU 303 performs these processes. The data input/output interface 306 is an interface for inputting and outputting image data as printing target data. The user can use the personal computer 301 and user interface 302 to send instructions to the printing device 1 for printing a patch chart PT (see FIG. 4).

Figure 2:
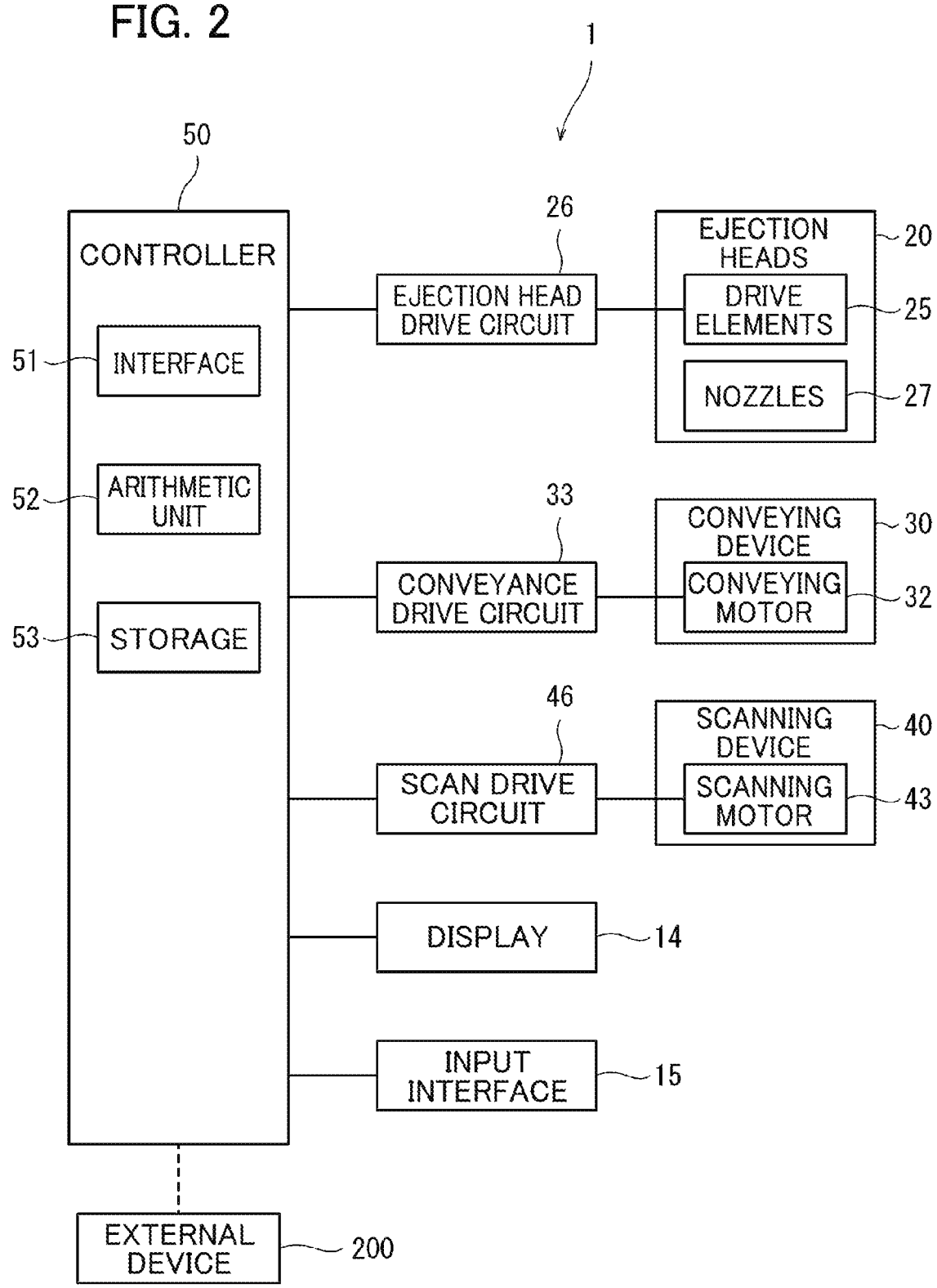
FIG. 2 is a block diagram showing a configuration of a control system of a printing device shown in FIG. 1.

FIG. 2 is a block diagram showing the configuration of the control system in the printing device 1 shown in FIG. 1. As shown in FIG. 2, the ejection heads 20 have a plurality of drive elements 25. The drive elements 25 may be piezoelectric elements, heating elements, electrostatic actuators, and the like. The drive elements 25 are provided for respective nozzles 27 formed in the ejection heads 20 and apply pressure to the ink to eject ink droplets from the corresponding nozzles 27.

The printing device 1 is further provided with a display 14, an input interface 15, and a controller 50. The controller 50 has an interface 51, an arithmetic unit 52, and a storage 53. The interface 51 receives image data and other various data from an external device 200. The external device 200 may be a computer, a camera, a communication network, a storage medium, a display, a printer, or the like. The image data is raster data and the like representing an image to be printed on print media W. The image data includes information on printing conditions such as the type of print medium W and the like. The controller 50 may be configured as a standalone device, or a plurality of devices in a distributed arrangement. In the latter case, the devices interact with each other to operate the printing device 1.

The storage 53 stores patch chart data representing a patch chart PT (see FIG. 4). The storage 53 is memory that the arithmetic unit 52 can access. The storage 53 has RAM and ROM. The RAM temporarily stores various data, including data received from the external device 200, such as image data, and data converted by the arithmetic unit 52. The ROM stores a printing program, a color measurement program, prescribed data, and the like for performing various data processes. As an alternative to the storage 53, the printing program and color measurement program may be stored in an external storage medium such as a CD-ROM that is accessible by the arithmetic unit 52.

The arithmetic unit 52 includes a CPU or other processor and at least one circuit, such as an ASIC or other integrated circuit. By performing the printing program and color measurement program, the arithmetic unit 52 controls the components of the printing device 1 to implement a printing operation and other various operations.

In accordance with instructions from the controller 50, the display 14 displays images represented by image data, and the like. The input interface 15 includes buttons and the like, for example, that the user operates. Alternatively, the input interface 15 may be a touchscreen integrated with the display 14.

The controller 50 is electrically connected to the conveying motor 32 of the conveying device 30 via a conveyance drive circuit 33 for controlling the drive of the conveying motor 32. Accordingly, the controller 50 controls conveyance of the print medium W by the conveying rollers 31 of the conveying device 30. The controller 50 is also electrically connected to the scanning motor 43 of the scanning device 40 via a scan drive circuit 46 for controlling the drive of the scanning motor 43. Accordingly, the controller 50 controls movement of the ejection heads 20 by the carriage 41 of the scanning device 40. The controller 50 is further electrically connected to the drive elements 25 via an ejection head drive circuit 26. The controller 50 outputs control signals for the drive elements 25 to the ejection head drive circuit 26, and the ejection head drive circuit 26 generates and outputs drive signals to the drive elements 25 on the basis of these control signals. When driven according to the drive signals, the drive elements 25 eject ink droplets from corresponding nozzles 27.

With the printing device 1 having the above configuration, the controller 50 acquires image data and performs a printing operation based on this image data. In the printing operation, the controller 50 ejects ink onto the print medium W from the ejection heads 20 while moving the ejection heads 20 in the moving direction Ds for each printing pass. Next, the controller 50 conveys the print medium W forward in the conveying direction Df. The printing device 1 repeatedly alternates between a printing pass and a conveying operation in this way to print an image on the print medium W based on the image data.

Figure 3:
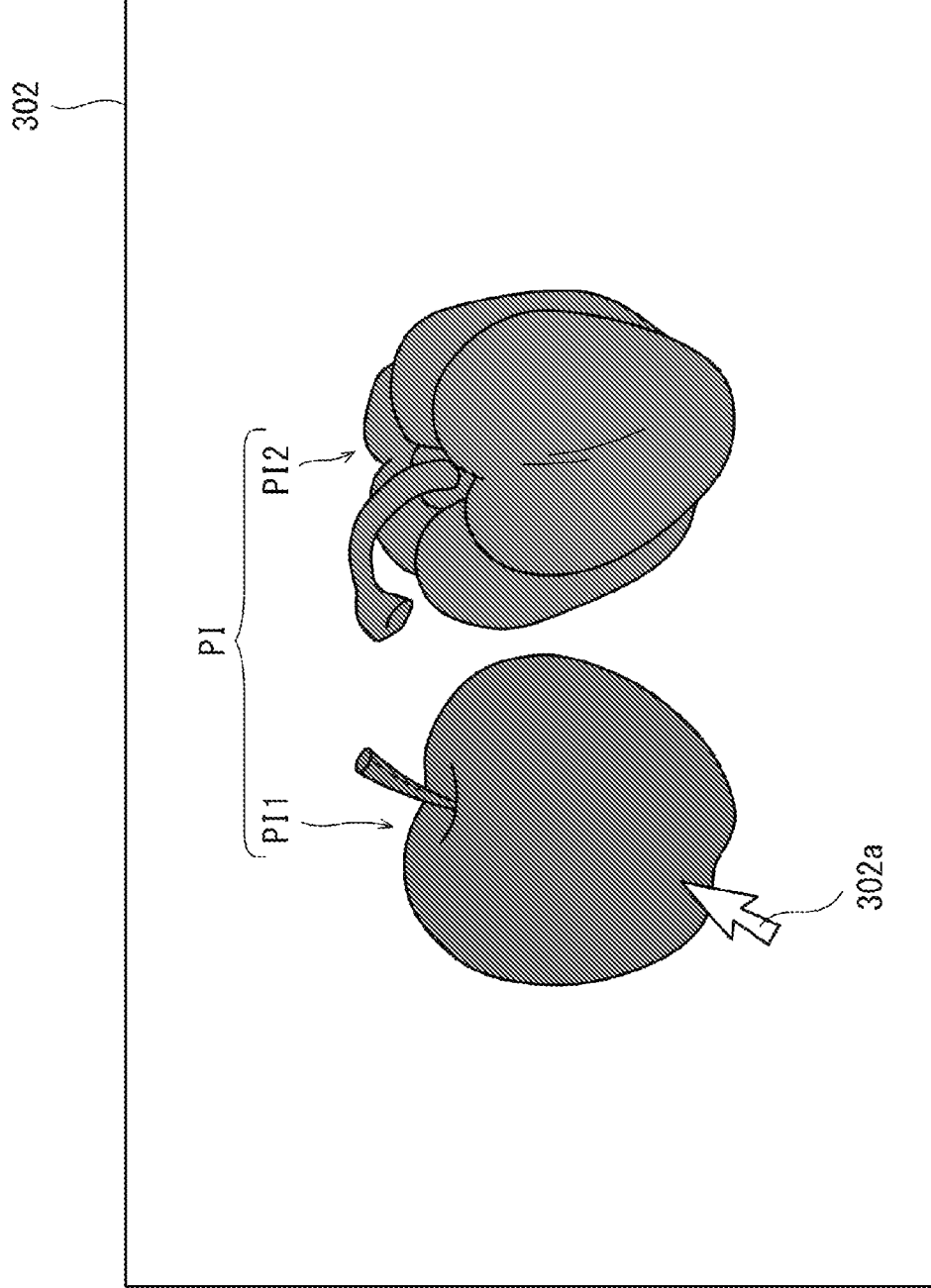
FIG. 3 is an explanatory diagram showing a sample preview image displayed on a user interface and an image designated by a user within the preview image.

FIG. 3 shows a sample preview image PI displayed on the user interface 302 based on image data. The display in FIG. 3 also shows an example of an image designated by a user within the preview image PI.

The CPU 303 in the personal computer 301 displays the preview image PI on the user interface 302 based on image data stored in the storage 305. The preview image PI in the example of FIG. 3 includes an apple preview image PI1 and a bell pepper preview image PI2. When the preview image PI is displayed on the user interface 302, the user specifies an image (pixel) having the color for which the user wishes to create a patch P (a second patch Ps described later). In the example of FIG. 3, the user has moved a pointer 302a over the user interface 302 to indicate a pixel in the apple preview image PI1 (desired color in the apple preview image PI1). Information related to the user-specified image is transmitted via the data input/output interface 306 to the controller 50 of the printing device 1.

FIG. 4 shows an example of a patch chart PT printed on a print medium W. FIG. 5 shows another example of a patch chart PT printed on a print medium W. A direction Dm indicated in FIGS. 4 and 5 from the upstream side toward the downstream side in the conveying direction Df denotes a color measuring direction Dm indicating the order in which patch colors are measured.

As shown in FIG. 4, the patch chart PT has a plurality of patches P arranged in the front-rear direction and the left-right direction to form a grid pattern. Thus, the any patch P in the patch chart PT can be defined by its column and row. In this case, the left-right position of a patch P in the patch chart PT is defined by its column and the front-rear position of the patch P is defined by its row. The patch chart PT includes a first patch area R1 in which first patches Pb are arranged, and a second patch area R2 in which second patches Ps are arranged. The second patch area R2 is different from the first patch area R1 and constitutes a margin area adjacent to the first patch area R1 in the moving direction Ds. Each of the first patch area R1 and second patch area R2 is formed in a rectangular shape in a plan view, for example. The patch chart PT includes a plurality of patch columns PR, with each patch column PR having a plurality of patches P arranged linearly in the conveying direction Df. In other words, the plurality of patch columns is arranged in parallel, and patches is arranged linearly in each patch column. Patch columns PR in the first patch area R1 are formed of first patches Pb, while patch columns PR in the second patch area R2 are formed of second patches Ps.

The first patches Pb are patches P corresponding to the basic colors in the image data and are arranged at predetermined positions in the patch chart PT. The basic colors are predetermined colors, and patches of basic colors are always included in the first patch area R1 of the patch chart PT. The second patches Ps, on the other hand, have colors that the user has specified in the preview image PI described above. Each second patch Ps is a patch P having a color specified by the user in the preview image PI shown in FIG. 3. The second patches Ps are arranged in the second patch area R2 of the patch chart PT. To form second patches Ps, the controller 50 generates raster data that includes the ink color, droplet size, and droplet ejection order (arrangement) for forming patches P corresponding to second patches Ps. The first patches Pb may be referred to as basic patches, while the second patches Ps may be called key patches.

The patch chart PT in FIG. 4 is provided with a patch Pd1, referred to as a dummy patch, positioned on the upstream side of the patch chart PT in the color measuring direction Dm. In this example, the patch Pd1 is arranged on the upstream side of the second patch area R2 in the color measuring direction Dm. The patch Pd1 may have the same color as one of the first patches Pb or second patch Ps or may be a different color. Further, the patch Pd1 may have the same area (the same dimensions) as the first patches Pb or second patches Ps or may have a different area. The patch Pd1 will be described later.

The patch chart PT shown in FIG. 5 is basically the same as the patch chart PT in FIG. 4, but the position of the dummy patch is different. In the patch chart PT of FIG. 5, the patch columns PR may have a mixed patch column PRc at the right end region of the first patch area R1. The mixed patch column PRc includes both first patches Pb and patches Pd2 different from the first patches Pb. The mixed patch column PRc includes a plurality of first patches Pb arranged on the upstream side in the color measuring direction Dm, and a plurality of patches Pd2 arranged on the downstream side in the color measuring direction Dm. In the example of FIG. 5, the patches Pd2 are interposed between first patches Pb and second patches Ps in the moving direction Ds. As with the dummy patch Pd1, the patches Pd2 are also referred to as dummy patches and may be the same color as the first patches Pb or second patches Ps or may be a different color. The dummy patches Pd2 may also have the same area (the same dimensions) as the first patches Pb or second patches Ps or may have a different area. The dummy patches Pd2 will be described later.

Here, a process (positional correction) must be performed to acquire position information on the patches P in order to measure the color of each patch P. Therefore, a process to acquire position information on each patch column PR is performed prior to measuring the color of each patch P. This process will be described in detail below.

After printing the patch chart PT with the printing device 1, the user places the print medium W having the printed patch chart PT on the base 202 of the colorimetric device 201. The patch chart PT includes at least three first marker images Mi1 arranged at positions surrounding or within an entire patch area including the first patch area R1 and the second patch area R2, as shown in FIG. 4. In the present disclosure, the phrase "positions surrounding an area or region" represents a concept including positions at an outer boundary of the area or region or/and positions at an outside or/and inside neighborhood of that outer boundary.

Each first marker images Mi1 is an image designating (denoting) a position or region in the first patch area R1 or the second patch area R2. By specifying the first marker images Mi1, the controller 50 can specify the entire patch area including the first patch area R1 and the second patch area R2. Further, because the dimensions in the left-right direction and the front-rear direction of each patch are predetermined and the patches are continuously arranged in the first patch area R1, the controller 50 can specify the position of each patch P located in the first patch area R1 by specifying the first marker images Mi1. The first marker image Mi1 may be a frame of bold black line surrounding a patch P. When the first marker image Mi1 is formed in a region where the patch P is not formed, the first marker image Mi1 may be a bold frame surrounding a portion or region having the same dimensions of the first patch P in the first patch area R1. The first marker image Mi1 may have a shape of an arrow or a triangle that designates a patch or a region or portion. The first marker image Mi1 may have a specific color other than black.

The user rotates the arm 204 to move the color measuring unit 208 opposite a patch P or portion (or region) designated by each of at least three first marker images Mi1 arranged at positions surrounding or within the entire patch area including the first patch area R1 and the second patch area R2 on the print medium W, as shown in FIG. 4. As in the example of FIG. 4, the first marker images Mi1 may be an image designating a patch P located in the corner of the first patch area R1 forming the left edge and front edge, an image designating a patch P located in the corner of the first patch area R1 forming the left edge and rear edge, and an image designating a portion (or region) positioned in the corner of the second patch area R2 forming the right edge and front edge. The CPU 303 acquires position information on each first marker image Mi1 by specifying the position of the color measuring unit 208 when the color measuring unit 208 opposes a patch or portion (or region) designated by each of the first marker images Mi1 based on the rotated angles of the first link 205 and second link 206 constituting the arm 204. Movement of the arm 204 may be controlled by the CPU 303. The number of first marker images Mi1 may be four or more.

The CPU 303 acquires position information on each first patch Pb in the patch chart PT on the basis of the information on the three first marker positions acquired above. Since the area of the first patch area R1, the area of each patch column PR, and the dimensions of each patch P are all known in this case, the CPU 303 can calculate position information on each first patch Pb simply by acquiring position information on the three first marker images Mi1.

The method of acquiring position information on second patches Ps is essentially the same as that for the first patches Pb. The patch chart PT includes at least three second marker images Mi2 arranged at positions surrounding or within the second patch area R2. Each second marker images Mi2 is an image designating a position or region in the second patch area R2. By specifying the second marker images Mi2, the controller 50 can specify the second patch area R2. Further, because the dimensions in the left-right direction and the front-rear direction of each patch are predetermined, the controller 50 can specify the position of each patch P located in the second patch area R2 by specifying the second marker images Mi2. The second marker image Mi2 may be a bold frame of black color surrounding a patch P. The combination of shape and color of the second marker image Mi2 may be different from that of the first marker image Mi2 so the user and the controller 50 can distinguish the second marker images Mi2 from the first marker images Mi1. When the second marker image Mi2 is formed in a region where the patch P is not formed, the second marker image Mi2 may be a bold frame surrounding a portion or region having the same dimensions of the second patch P in the second patch area R2. The second marker image Mi2 may have a shape of an arrow or a triangle that designates a patch or a region or portion. The second marker image Mi2 may have a specific color other than black.

The user rotates the arm 204 to move the color measuring unit 208 opposite a patch P or portion (region) designated by each of at least three second marker images Mi2 located at positions surrounding or within the second patch area R2 on the print medium W. As in the example of FIG. 4, the second marker images Mi2 may be an image designating a patch P located in the corner of the second patch area R2 forming the left edge and front edge, an image designating a patch P located in the corner of the second patch area R2 forming the left edge and rear edge, and an image designating a portion or region located in the second patch area R2 forming the right edge and rear edge. The CPU 303 acquires position information on the second marker image Mi2 by specifying the position of the color measuring unit 208 when the color measuring unit 208 opposes a patch or portion (or region) designated by each of the second marker images Mi2 on the basis of the position information on each first marker image Mi1 and the rotated angles of the first link 205 and second link 206 constituting the arm 204. The number of second marker images Mi2 may be four or more. The CPU 303 acquires position information on each second patch Ps in the patch chart PT on the basis of the position information on the three second marker images Mi2 acquired above.

FIG. 6 shows a patch column table Tp that stores patch column information. After acquiring position information on the first patches Pb and second patches Ps in the patch chart PT as described above, the CPU 303 generates a patch column table Tp and stores the patch column table Tp in the storage 305. As shown in FIG. 6, the patch column table Tp stores information for each patch column PR specifying whether the patch column includes one or more second patches Ps (presence or absence of second patches Ps), the number of patches P arranged in the patch column PR, the starting position of the patch column PR (and specifically, the x coordinate and y coordinate of the patch P positioned on the upstream end of the patch column PR in the color measuring direction Dm), and the ending position of the patch column PR (and specifically, the x coordinate and y coordinate of the patch P positioned on the downstream end of the patch column PR in the color measuring direction Dm). The patch column table Tp may include information for the number of first patches Pb included in the patch column and the number of first patches Ps included in the patch column. The CPU 303 calculates the position of each patch P in the patch column PR on the basis of this patch column table Tp. Note that information on the presence or absence of second patches Ps in each patch column PR and the number of patches P arranged in each patch column PR may be stored in the patch column table Tp in advance.

To measure the colors of patches P in the patch chart PT with the colorimetry system 100, the user rotates the arm 204 to move the color measuring unit 208 opposite the patch P to be measured. In this state, the light-emitting element (211) of the color measuring unit 208 irradiates light onto the patch P. The light-receiving element (212) of the color measuring unit 208 receives the light irradiated from the light-emitting element (211) and reflected off the patch P. The color measuring unit 208 measures the color of the patch P based on the light received by the light-receiving element (212).

FIG. 7 shows a table Ta that correlates the color values of patches P with their measured color values (colorimetric values). For each patch P, the table Ta associates a type indicating whether the patch P is a first patch Pb or a second patch Ps with the position, RGB color values, and L*a*b* measured color values of the patch P. The table Ta is stored in the storage 305.

FIG. 8 is an explanatory diagram illustrating arrangement of first marker images Mi1 and second marker images Mi2 in a patch chart PT.

In the present embodiment, the CPU 303 may acquire position information so that the number of acquired second marker positions is greater than the number of acquired first marker positions. In the example of FIG. 8, the number and layout of first marker images Mi1 is identical to that in FIG. 4. The number of first marker images Mi1 is three. However, six new second marker images Mi2 are included in the example of FIG. 8 in addition to the three second marker images Mi2 shown in FIG. 4. The six additional second marker images Mi2 are images designating second patches Ps or portions (regions) at positions surrounding the second patch area R2. The CPU 303 acquires position information on first marker images Mi1 and position information on second marker images Mi2 on the basis of the respective positions of the color measuring unit 208 opposing patches or regions designated by the first marker images Mi1 and second marker images Mi2 arranged in this way. However, the number and layout of first marker images Mi1 and second marker images Mi2 may be set arbitrarily and are not limited to the example in FIG. 10. In the example shown in FIG. 8, the second marker images Mi2 may be arranged in the conveying direction Df at regular intervals.

As shown in FIG. 8, the number of first marker images Mi2 is greater than the number of second marker images Mi2 in the patch chart PT.

Figure 9:
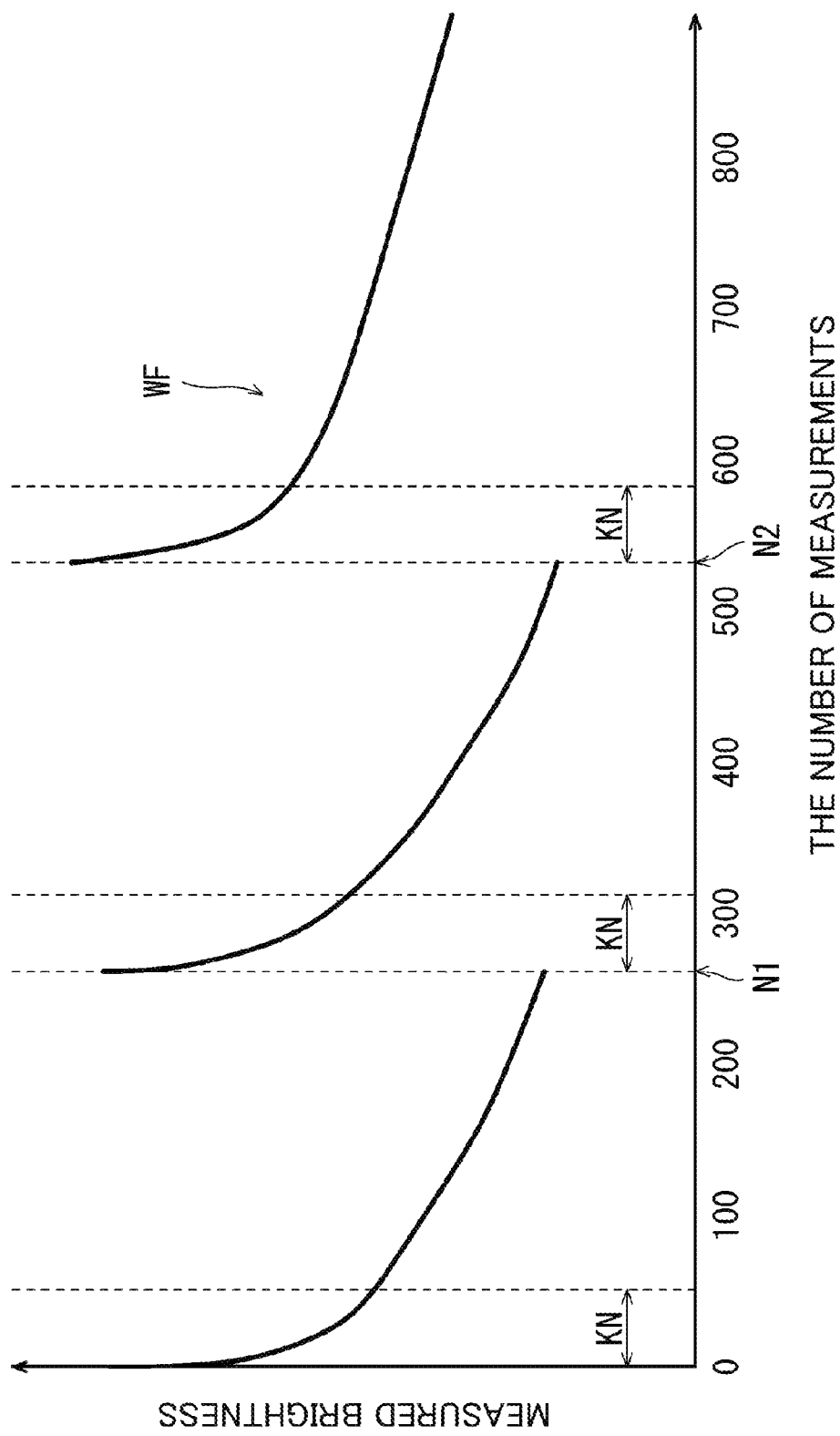
FIG. 9 is a graph showing an example of a relationship between the number of measurement times and calibration processes.
Figure 10:
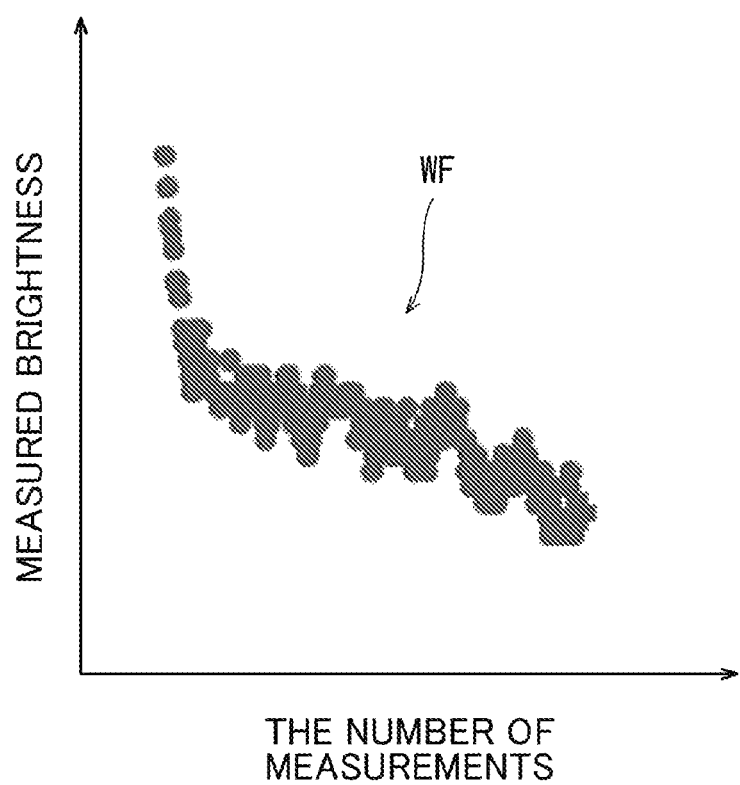
FIG. 10 is a graph showing raw data of one waveform of measured color values shown in FIG. 9.

FIG. 9 shows a sample relationship between measurement times and calibration processes of the color measuring unit 208. FIG. 10 is a graph in which data for one measured color value waveform WF in FIG. 9 has been plotted. While measured color values are expressed as data plotted in a graph, as shown in FIG. 10, FIG. 9 represents this plotted data as a curve for simplification.

When the color measuring unit 208 measures the colors of patches P continuously, the brightness of the measured color values decreases due to changes in measurement environment such as increasing of temperature, as illustrated in FIG. 9. Specifically, after each calibration process is completed, the brightness of the measured color values tends to be relatively high for a prescribed number of measurements, after which the brightness of the measured color values tends to become relatively low. Therefore, in the present embodiment the color measuring unit 208 measures the colors of patches P (including first patches Pb and second patches Ps) immediately after calibration process in order to improve the reliability of the measured color values. More specifically, the color measurement of patches is measured up to the prescribed number of times after each calibration process.

In the example of FIG. 9, the colors of patches P including the first patches Pb and the second patches Ps are measured in a color measurement interval KN of a prescribed number of times after the firstly-performed color measurement, and in a color measurement interval KN of a prescribed number of times after the secondly-performed calibration process at timing N2.

In an intermediate interval between the two successive color measurement intervals KN, the brightness of the measured color values is lower than that during the color measurement interval KN. In this low-brightness intermediate interval, the color measuring unit 208 may measure the colors of first patches Pb but not measure a color of any second patch Ps. Accordingly, brightness of the measured color values of the second patches can be relatively high, thereby improving the reliability of the measured color values.

Figure 11:
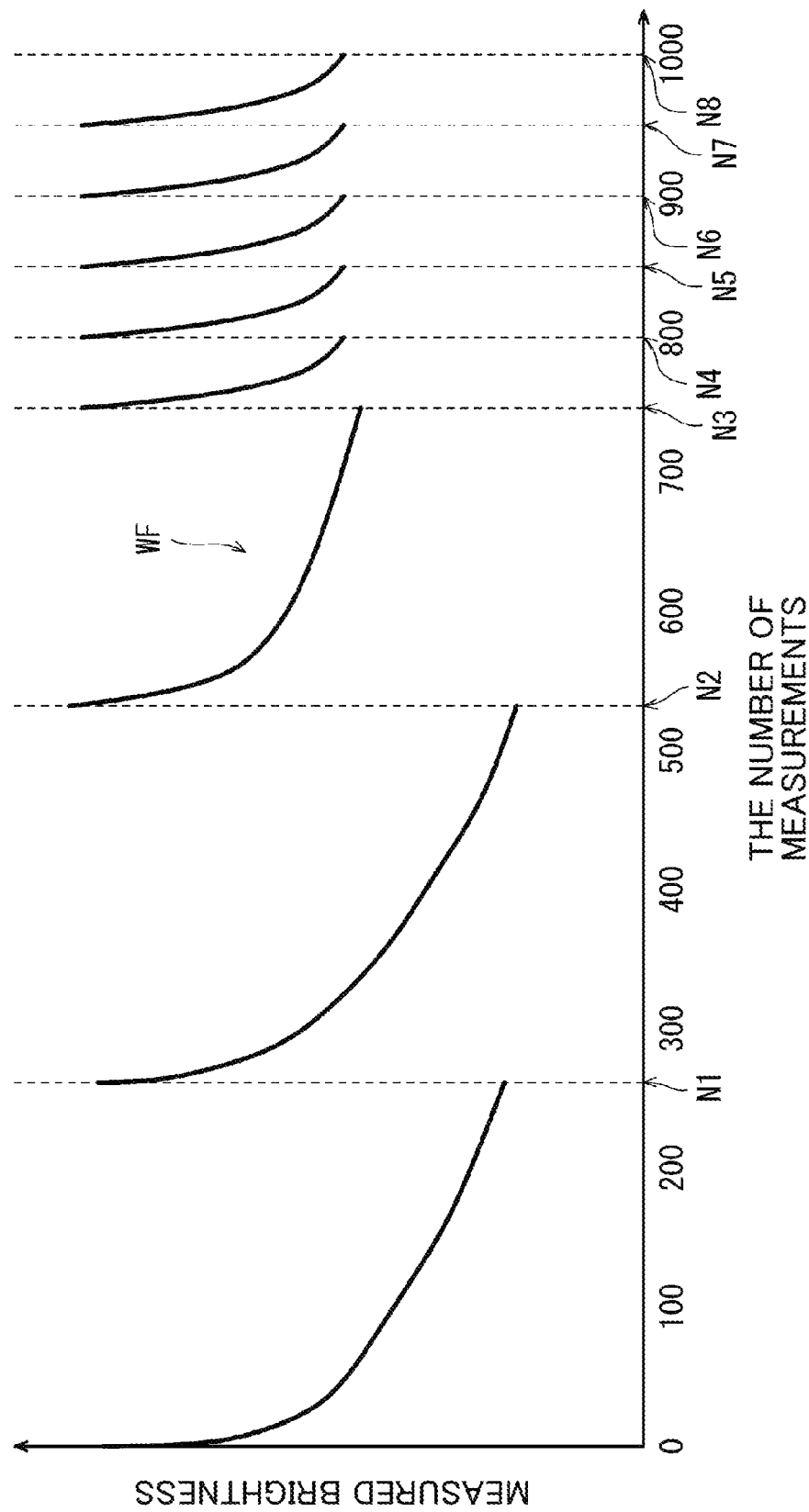
FIG. 11 is a graph showing another example of a relationship between the number of measurement times and calibration processes.

As an alternative, the colors of patches P may be measured as follows. FIG. 11 shows a different example of the relationship between measurement times and calibration processes.

As shown in FIG. 11, the color measuring unit 208 is calibrated after a prescribed number of times of color calibration processes is performed. In the example shown in FIG. 11, after the colors of all the first patches Pb are measured, the colors of the second patches Ps are measured. N1 in FIG. 11 indicates the timing of a firstly-performed calibration process performed after the color measurement of first patches Pb has been performed the prescribed first specific number of times, and N2 indicates the timing of a secondly-performed calibration process performed after the color measurement of first patches Pb has been performed the prescribed first specific number of times following the firstly-performed calibration process.

On the other hand, a thirdly-performed calibration process is performed at a timing N3 that measurements for all the first patches Pb are completed. In this case, the timing N3 is after completing the number of color measurements lower than or equal to the prescribed first specific number of measurements in order to calibrate the color measuring unit 208 prior to measuring the colors of second patches Ps (i.e., patches P that are particularly important).

In other words, when the patch column PR includes at least one second patch Ps, the color measuring unit 208 is calibrated at this time (N3) prior to measuring the colors of patch P in the patch column PR (i.e., measuring second patches Ps only, or both first patches Pb and second patches Ps in a case that the target patch column includes both the first patches Pb and second patches Ps), even when the number of color measurements is lower than or equal to the prescribed first specific number following the secondly-performed calibration process at timing N2. Therefore, the thirdly-performed calibration process for measuring colors of second patches Ps is performed at the timing N3 after completing fewer color measurements than the standard number (the prescribed first number) of color measurements performed for the firstly-performed and secondly-performed calibration processes. In other words, after measurements of all the first patch Pb are completed and before measurements of the second patches Ps is started, a calibration process (thirdly-performed calibration process in this case) is always performed even if the number of measurements is lower than the prescribed first specific number of measurements since the immediately-previous calibration process has been performed. As described above, the color measuring unit 208 is calibrated each time a first specific number of color measurements is completed while continuously measuring the colors of first patches Pb. After, the timing N3, the color measuring unit 208 is calibrated each time a second specific number of color measurements smaller than the first specific number is performed while continuously measuring the colors of second patches Ps. As a result, the frequency of calibration processes for color measurements of second patches Ps is higher than the frequency of calibration processes for color measurements of first patches Pb. Since the patches P become second patches Ps from the $730^{th}$ patch P in the example of FIG. 11, the timing N3 described above corresponds to the time at which color measurements have been completed for 729 first patches Pb.

After each calibration process is completed in FIG. 11, the brightness of the measured color values tends to be relatively high up to the prescribed second specific number of measurements, after which the brightness of the measured color values tends to be relatively low. Therefore, the color measuring unit 208 performs color measurements on second patches Ps immediately after a calibration process in order to improve the reliability of the measured color values. More specifically, the color measurement of second patches Ps is performed up to a prescribed second specific number of times following each calibration process. In FIG. 11, color measurement of second patches Ps is performed a prescribed second specific number of times between the calibration process at timing N3 and the calibration process at timing N4 and a prescribed second specific number of times between the calibration process at timing N4 and the calibration process at timing N5. The same process is repeated from timing N5. In other words, the plurality of calibration processes is performed in a manner that a calibration process is performed each time the measurement of the second patches is performed the prescribed second number of times (=N4−N3) since an immediately-previous calibration process has been performed. In other words, in a case that the plurality of calibration processes includes a first calibration process and a second calibration process, and the first calibration process and the second calibration process are performed in this order without a calibration process being performed therebetween, the second calibration process is performed in a case that the number of times of color measurements performed for the second patches after completion of the first calibration process reaches the second specific number of times.

Figure 12:
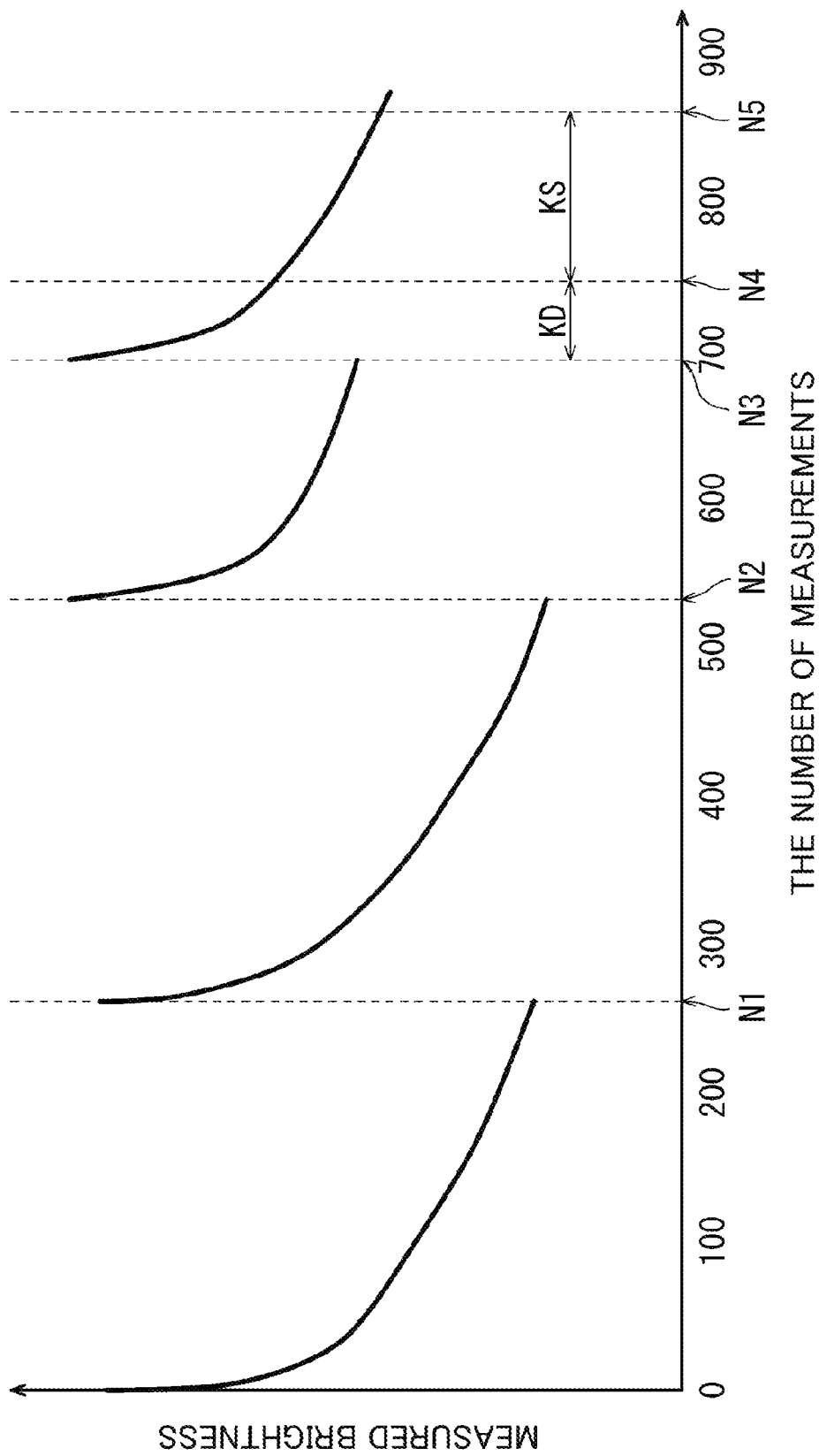
FIG. 12 is a graph showing another example of a relationship between the number of measurement times and calibration processes.

As another alternative, the colors of second patches Ps may be measured as follows. FIG. 12 shows another example of the relationship between measurement times and calibration processes.

As shown in FIG. 12, the difference between the maximum and minimum brightness of measured color values tends to be relatively large up to a prescribed first number of measurements immediately after each calibration process is completed. In other words, variation in measured color values is relatively large up to the prescribed first number of measurements immediately after calibration process. Therefore, the colors of second patches Ps are measured at measurement times in which the variation in measured color values is relatively small. In the example of FIG. 12, the CPU 303 performs color measurements on the first patches Pb from the start of measurements to the timing N3. Here, the at the timings N1, N2, and N3, the calibration processes are performed in a similar manner to the example shown in FIG. 11. In a color measurement interval KD up to a timing N4 just after the calibration process a timing N3, the CPU 303 performs the prescribed first number of times of color measurements for the dummy patches, such as shown in the dummy patches Pd1 and Pd2 described above (FIGS. 4 and 5). Thereafter, the CPU 303 performs the prescribed second number of times of color measurements for the second patches Ps in a color measurement interval KS up to the timing N5 from the timing N4. In this case, the prescribed first number is the number N4−N3, the prescribed second number is the number N5−N4. As described above, the CPU 303 acquires, as the measured color values of second patches Ps, results of a prescribed second number of successive color measurements that follows a prescribed first number of successive color measurements after the calibration timing of the color measuring unit 208. This enables the CPU 303 to suppress variations in measured color values for second patches Ps.

Here, the patch chart PT may be formed so that the CPU 303 performs the prescribed second number of times of color measurements for second patches Ps (in the interval KS from timing N4 to timing N5 in FIG. 12) following the prescribed first number of times of color measurements, without having to perform color measurements on dummy patches. This patch chart PT is described below in detail.

Figure 13:
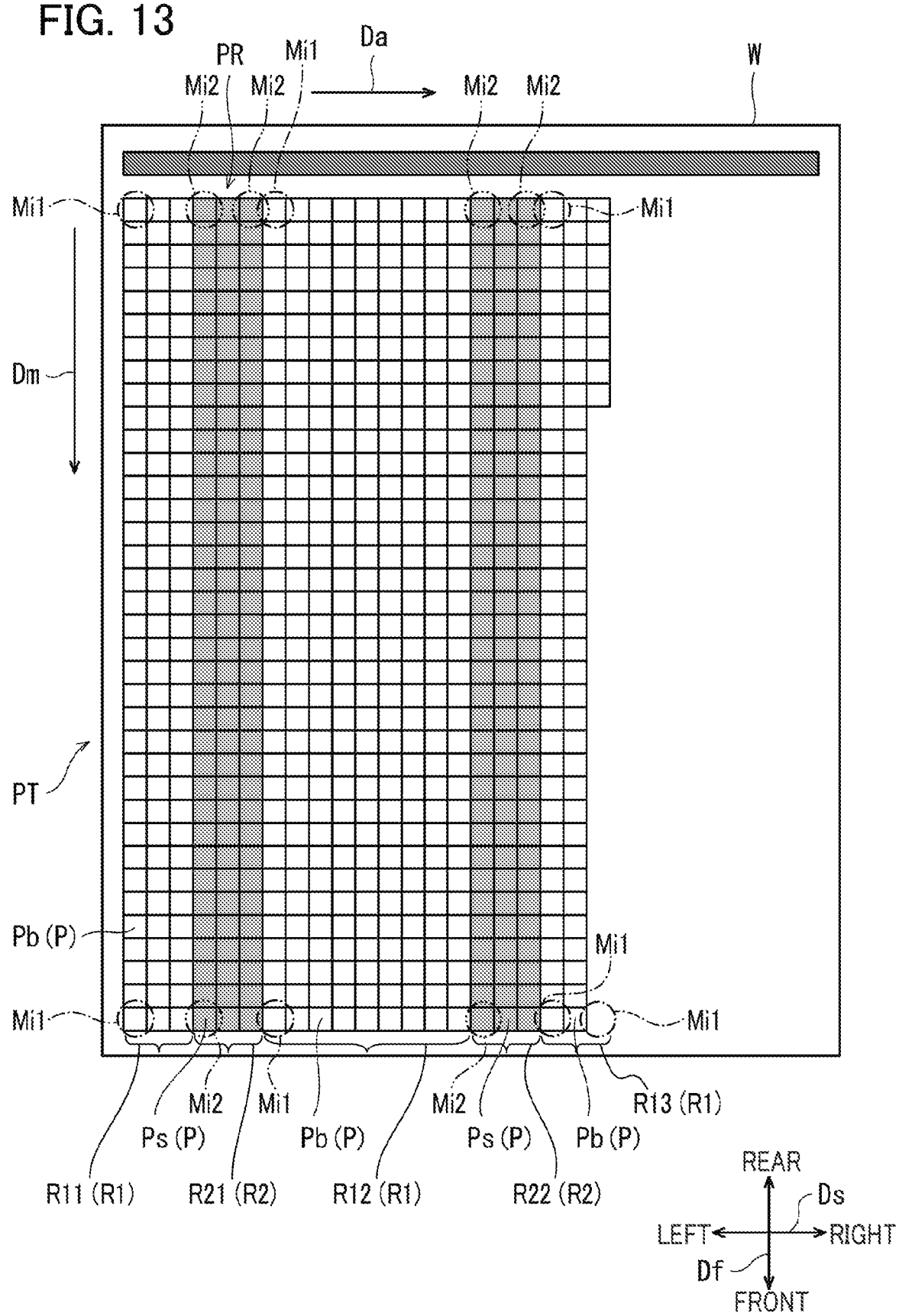
FIG. 13 is an explanatory diagram showing another example of a patch chart printed on a print medium.

FIG. 13 shows another example of a patch chart PT formed on a print medium W. The patch chart PT shown in FIG. 13 differs from the patch chart PT in FIG. 4. As shown in FIG. 13, the patch chart PT includes separate three first patch areas R1 (R11, R12, and R13) and separate two second patches areas R2 (R21, R22). Each of the first patch areas R11, R12, and R13 includes first patches Pb only, and each of the second patch areas R21 and R22 includes second patches Ps only. The second patch areas R21 and R22 are represented a gray color in FIG. 13. The patch areas R11, R21, R12, R22, and R13 are arranged in this order in the rightward direction (hereinafter, referred to as the arrangement direction Da). In other words, the first patch areas R11, R12, and R13 alternate positions with the second patch areas R21 and R22 in the left-right direction. The number of patch columns PR included in the second patch area R21 is the same as that in the second patch area R22 and is three in this example. The number of patch columns PR included in the first patch area R11 is smaller than that in the first patch area R12.

The number of first patches Pb included in the first patch areas R11 is equal to the prescribed first number, the number of second patches Ps included in the second patch areas R21 is equal to the prescribed second number. The number of first patches included in the first patch area R12 is a prescribed third number, and the number of second patches Ps included in the second patch area R22 is a prescribed fourth number that is equal to the prescribed second number. The arrangement direction Da is a direction orthogonal to the color measuring direction Dm.

The color measurements of the patches are sequentially performed from patches in the leftmost patch column PR toward right. In each patch column, the color measurements are sequentially performed from the rearmost patch toward the front. Before color measurement of the patch chart PT shown in FIG. 13 starts, one calibration is performed. Thereafter, color measurements of the first patches Pb in the first patch area R11 are performed. That is, the prescribed first number of times of color measurements for the first patches Pb in the first patch area R11 is performed in an interval similar to (or corresponding to) the color measurement interval KD in which variation in measured color values is relatively large. Next, color measurements for the second patches Ps in the second patch area R21 are performed. That is, the prescribed second number of times of color measurements for the second patches in the second patch area R21 is performed in an interval similar to the color measurement interval KS in which variation in measured color values is relatively low.

After completion of color measurements of second patches Ps in the second patch area R21, color measurements of the first patches Pb in the first patch area R12 are performed. In a period for color measurements of the first patches Pb in the first patch area R12, one calibration process is performed when the number of unmeasured first patches Pb becomes the prescribed first number. This calibration process may be performed when the number of unmeasured first patches Pb is larger than the prescribed first number. While measuring the first patches Pb in the first patch area R12, other calibration processes may be performed before the number of unmeasured first patches becomes the prescribed first number.

Thereafter, the prescribed first number of color measurements of remaining first patches Pb in the first patch area R12 is performed without any calibration process being performed therebetween, and the color measurements of a second patch Ps in the second patch area R22 starts. Since the prescribed first number of color measurements of first patches Pb has been performed after the previous calibration process, variation in measured color values becomes relatively low. Accordingly, the second patches Ps in the second patch area R22 can be measured under a situation that variation in measured color values is relatively low. In other words, the interval in which the prescribed first number of color measurements of remaining first patches Pb in the first patch area R12 is performed corresponds to the color measuring interval KD shown in FIG. 12. The interval in which the prescribed fourth number (=the prescribed second number) of color measurements of second patches Ps included in the second patch area R22 is performed corresponds to the color measurement interval KS.

The CPU 303 can control the color measuring unit 208 to measure the colors in each patch column PR of the patch chart PT in sequence in the arrangement direction Da. The CPU 303 can perform the color measurements of the second patches in the second patch area R22 (R2) in a case that the first number of first patches Pb is measured after the calibration process, which corresponds to the calibration process at the timing N3 in FIG. 12, is performed.

This method in which no color measurement of a dummy patch is performed is applicable to a case of measuring the patch chart PT shown in FIG. 8. That is, in a period for color measurements of the first patches Pb in the first patch area R, one calibration process is performed when the number of unmeasured first patches Pb becomes the prescribed first number. While measuring the first patches Pb in the first patch area R1, other calibration processes may be performed in a manner similar to that shown in FIG. 11 before the number of unmeasured first patches becomes the prescribed first number. Thereafter, the prescribed first number of color measurements of remaining first patches Pb in the first patch area R1 is performed without any calibration process being performed therebetween, and the color measurements of a second patch Ps in the second patch area R2 starts. Accordingly, the second patches Ps in the second patch area R2 can be measured under a situation that variation in measured color values is relatively low.

A printing device 1A according to a second embodiment is essentially the same as the printing device 1 in the first embodiment but differs from the first embodiment in that the printing device 1A has a built-in colorimetric device 70. The controller 50 in the second embodiment can perform the processes the same as that of the first embodiment. Specifically, the controller 50 in the second embodiment can form the patch charts PT described in the first embodiment or the variations thereof, and a process for measuring colors of the patches P similar to that performed by the CPU 303 in the first embodiment and, hence, a description of this process has been omitted. In this embodiment, the arithmetic unit 52 corresponds to the computer and the color measurement controlling means. In the following description, structures in the printing device 1A of the second embodiment identical to those in the printing device 1 of the first embodiment are designated with the same reference numerals to avoid duplicating description.

Figure 15:
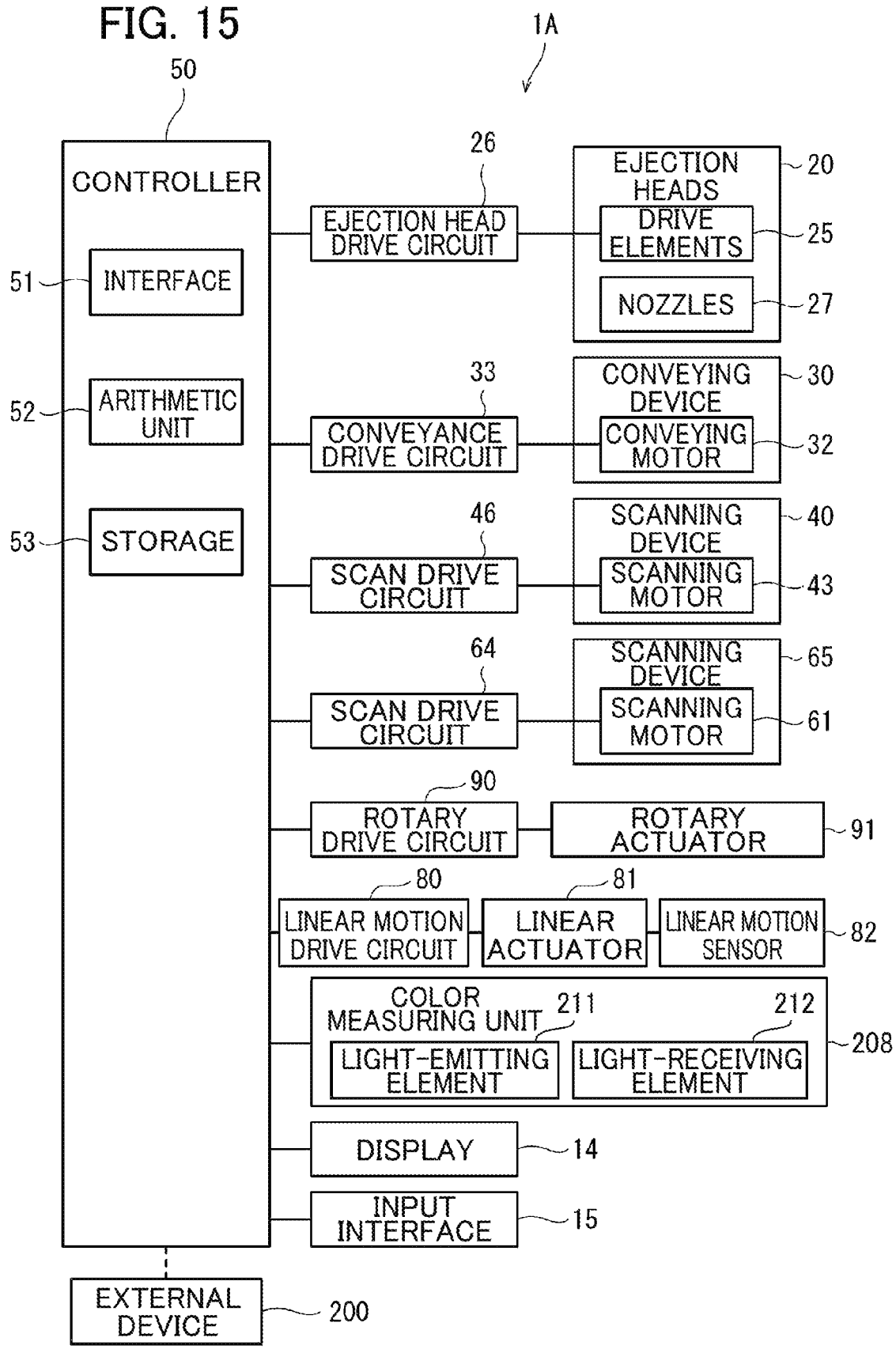
FIG. 15 is a block diagram showing a configuration of a control system of the printing device shown in FIG. 14.

FIG. 14 is a plan view showing the printing device 1A according to the second embodiment. FIG. 15 is a block diagram showing the configuration of a control system in the printing device 1A of FIG. 14. As shown in FIG. 14, the printing device 1A has, in addition to the structures possessed by the printing device 1, additional conveying rollers 31 having the same function as the conveying rollers 31 in the printing device 1, a pair of guide rails 60, a scanning device 65 having a scanning motor 61, an endless belt 62, a pulley 63, and a colorimetric device 70. As with the colorimetric device 201 in the first embodiment, the colorimetric device 70 has the base 202, the first rotary joint 203, the arm 204, the second rotary joint 207, color measuring unit 208, prismatic joint 209, and white reference 210.

The pair of guide rails 60 is arranged downstream of the carriage 41 in the conveying direction Df. The guide rails 60 extend in the moving direction Ds. The additional conveying rollers 31 described above are disposed downstream of the guide rails 60 in the conveying direction Df. The endless belt 62 extending in the moving direction Ds is attached to the base 202 of the colorimetric device 70. The endless belt 62 is also attached to the scanning motor 61 via the pulley 63. When the scanning motor 61 is driven, the endless belt 62 circulates, and the base 202 reciprocates in the moving direction Ds along the guide rails 60. In this way, the base 202 moves the color measuring unit 208 in the moving direction Ds. The base 202 corresponds to the moving member. The size of the base 202 in the second embodiment is smaller than that in the first embodiment. For example, in the second embodiment, the dimension of the base 202 in the left-right direction may be smaller than that of the print medium W. Though in the first embodiment the print medium W is placed on the base 202, in the second embodiment the print medium W is passing through a region below the base 202, and the print medium W is not placed on the base 202.

As shown in FIG. 15, the controller 50 is electrically connected to the scanning motor 61 via a scan drive circuit 64 for controlling the drive of the scanning motor 61. Accordingly, the controller 50 controls movement of the color measuring unit 208 in the moving direction Ds with the base 202. The controller 50 is also connected to a rotary actuator 91 configured of a motor and the like, for example, via a rotary drive circuit 90. Accordingly, the controller 50 controls rotary motion of the arm 204 with the rotary joints 203 and 207 described above.

In order to move the color measuring unit 208 in the up-down direction, the colorimetric device 70 is further provided with a linear motion drive circuit 80, a linear actuator 81 that is provided on the prismatic joint 209 described above and includes a motor and the like, for example, and a linear motion sensor 82. The linear actuator 81 moves the color measuring unit 208 up and down to place the color measuring unit 208 into contact with and separate from the print medium W. The controller 50 is connected to the linear actuator 81 via the linear motion drive circuit 80, and to the linear motion sensor 82. The linear motion sensor 82 is an encoder, for example, that detects the amount of movement of the linear actuator 81. The controller 50 controls the operations of the linear actuator 81 on the basis of detection results by the linear motion sensor 82, thereby controlling vertical movement of the color measuring unit 208 on the basis of the detection results of the linear motion sensor 82.

Thus, to move the print medium W and color measuring unit 208 relative to each other, the color measuring unit 208 has the conveying device 30 that conveys the print medium W in the conveying direction Df, the base 202 that moves the color measuring unit 208 in the moving direction Ds, the rotary actuator 91 that moves the color measuring unit 208 in the moving direction Ds and the conveying direction Df, and the linear actuator 81 that moves the color measuring unit 208 in the up-down direction.

The color measuring unit 208 includes the light-emitting element 211 and the light-receiving element 212.

The controller 50 specifies the position of each patch P printed on the print medium W and controls the measuring unit 208 to oppose the specified position of the patch and to measures the color of the patch P.

FIG. 16 shows a sample patch chart PT printed by the printing device 1A on a print medium W. The patch chart PT in FIG. 16 differs from the patch chart PT employed in the colorimetry system 100 of the first embodiment. The color measuring direction Dm in the patch chart PT of FIG. 16 is the direction from one side (the left side) of the moving direction Ds toward the other side (the right side). The color measuring direction Dm may be a direction from the right side toward the left side. The controller 50 controls movement of the base 202 in the moving direction Ds and rotation of the arm 204 in the colorimetric device 70 while controlling the color measuring unit 208 to measure the colors of the patches P in a patch column PR in the color measuring direction Dm.

As in the first embodiment (FIG. 4 and the like), the positions of patches P in the patch chart PT of FIG. 16 can be defined by their columns and rows, but the left-right position of a patch P in the patch chart PT is defined by its row while the front-rear position of the patch P is defined by its column. Further, the first patch area R1 and second patch area R2 of the patch chart PT are adjacent to each other in the conveying direction Df. The second patch area R2 is arranged on the upstream side of the first patch area R1 in the conveying direction Df. The first patches Pb in the first patch area R1 and the second patches Ps in the second patch area R2 are arranged sequentially beginning from the patch on the downstream side in the conveying direction Df and on the right side in the moving direction Ds. This arrangement is implemented for each patch column PR while the patch columns PR are arranged toward the upstream side in the conveying direction Df. In the patch chart PT of FIG. 16, a dummy patch Pd1 is arranged on the downstream end of the second patch area R2 in the color measuring direction Dm, for example.

As in FIG. 11 of the first embodiment, when a patch column PR contains second patches Ps in this embodiment, the color measuring unit 208 is calibrated prior to measuring the colors of these second patches Ps. In this case, after the colors of all the first patches Pb are measured, the colors of the second patches Ps are measured. For example, the patch column PR are sequentially selected from the bottommost patch column toward upward. In this case, each time a patch column PR is selected, patches in the selected patch column PR are measured.

As in FIG. 12 of the first embodiment, the controller 50 in the present embodiment also acquires, as the measured color values of second patches Ps, results of a prescribed second number of successive color measurements that follows a prescribed first number of successive color measurements after the calibration timing of the color measuring unit 208. Specifically, the controller 50 controls the color measuring unit 208 to perform a prescribed number of color measurements on the dummy patch Pd1 in a color measurement interval KD for the prescribed first number of successive color measurements up to timing N4 in FIG. 12 that follows the calibration process at timing N3 in FIG. 12. Thereafter, the controller 50 controls the color measuring unit 208 to perform a prescribed second number of successive color measurements for second patches Ps in the color measurement interval KS up to timing N5 in FIG. 12 that follows the prescribed first number of successive color measurements. In other words, after the completion of the calibration process, the color measurement process is performed a prescribed first number of times in a first interval (the color measurement interval KD) and thereafter a prescribed second number of times in a second interval (the color measurement interval KS). The color measurement process for the second patch Ps included in the patch column is performed in the second interval. In this way, the controller 50 can suppress variation in the measured color values for second patches Ps.

As shown in FIG. 16 the patch column PR extends in the extending direction that is a leftward direction. The two or more patches P in the patch column are arranged in the extending direction. The two or more patches P in the patch column PR includes an upstream end patch at an upstream end in the extending direction (the leftward direction). The controller 50 selects the two or more patches P included in the patch column sequentially in the extending direction (the leftward direction) from the upstream end patch. Each time a patch P is selected from among the two or more patches included in the patch column PR, the color measurement process is performed for the selected patch P. That is, the color measurement processes are performed for the patches in the patch column one by one in an arrangement order of the patches in the extending direction from the upstream end patch. The color measurement process for the upstream end patch may be performed in the interval corresponding to in the color measurement interval KD in which variation in measured color values is relatively large.

In the patch chart PT shown in FIG. 16, the plurality of patch columns PR may include a mixed patch column PRc including one of the plurality of first patches and a different patch, such as the dummy patch Pd1 different from any one of the plurality of second patches Ps. As with the patch chart PT shown in FIG. 5, the mixed patch column PRc may be located in the upper end part of the first patch area R1 shown in FIG. 16. When performing color measurements for patches P in the patch chart PT including the mixed patch column PRc, the color measurement process for the different patch may be performed in the interval corresponding to the color measurement interval KD in which variation in measured color values is relatively large.

The method in which no color measurement of a dummy patch is performed and the colors of second patches Ps are performed in the low-variation interval (such as the interval KS) can be applied to color measurement for the patch chart PT shown in FIG. 16, in a similar manner described for FIG. 8.

FIG. 17 shows another example of a patch chart PT printed on a print medium W. The patch chart PT shown in FIG. 17 has the same technical concept as the patch chart PT in FIG. 13 basically.

That is, the patch chart PT includes separate three first patch areas R1 (R11, R12, and R13) and separate two second patches areas R2 (R21, R22). Each of the first patch areas R11, R12, and R13 includes first patches Pb only, and each of the second patch areas R21 and R22 includes second patches Ps only. To facilitate understanding, the second patch areas R21 and R22 having which patch columns PR including second patches Ps are colored gray in FIG. 17. The patch areas R11, R21, R12, R22, and R13 are arranged in this order in the upward direction (hereinafter, referred to as the arrangement direction Da). In other words, the first patch areas R11, R12, and R13 alternate positions with the second patch areas R21 and R22 in the up-down direction. The number of patch columns PR and the number of patches Pin each of R11, R21, R12, R22, and R13 shown in FIG. 17 are the same with those shown in FIG. 13.

The controller 50 controls the color measuring unit 208 to measure the colors of patch columns PR in the patch chart PT in sequence in the arrangement direction Da. The arrangement direction Da is a direction orthogonal to the color measuring direction Dm.

Before color measurement of the patch chart PT shown in FIG. 17 starts, one calibration is performed. Thereafter, color measurements of the first patches Pb in the first patch area R11 are performed. That is, the prescribed first number of times of color measurements for the first patches Pb in the first patch area R11 is performed in an interval corresponding to the color measurement interval KD in which variation in measured color values is relatively large. Next, color measurements for the second patches Ps in the second patch area R21 are performed. That is, the prescribed second number of times of color measurements for the second patches in the second patch area R21 is performed in an interval corresponding to the color measurement interval KS in which variation in measured color values is relatively low.

After completion of color measurements of patches Ps in the second patch area R21, color measurements of the first patches Pb in the first patch area R12 are performed. In a period for color measurements of the first patches Pb in the first patch area R12, one calibration process is performed when the number of unmeasured first patches Pb becomes the prescribed first number. While measuring the first patches Pb in the first patch area R12, other calibration processes may be performed before the unmeasured first patches becomes the prescribed first number.

Thereafter, the prescribed first number of color measurements of remaining first patches Pb in the first patch area R12 is performed without any calibration process being performed therebetween, and the color measurements of a second patch Ps in the second patch area R22 starts. Since the prescribed first number of color measurements of first patches Pb has been performed after the previous calibration process, variation in measured color values becomes relatively low. Accordingly, the second patches Ps in the second patch area R22 can be measured under a situation that variation in measured color values is relatively low.

Put differently, color measurements for the patch chart PT shown in FIG. 17 is performed as follows. That is, after the completion of the calibration process, the color measurement process is performed a prescribed first number of times in a first interval and thereafter a prescribed second number of times in a second interval. After the second interval, the color measurement process is performed a prescribed third number of times in a third interval. The plurality of patch columns includes one or more first patch columns PR in the first patch area R11, one or more second patch columns PR in the second patch area R21, and one or more third patch columns PR in the first patch area R12 arranged in this order in the arrangement direction Da. The one or more first patch columns includes the prescribed first number of first patches Pb. The one or more second patch columns includes the prescribed second number of second patches Ps. The one or more third patch columns includes the prescribed third number of first patches Pb. The controller 50 selects the plurality of patch columns sequentially in the arrangement direction Da. Each time a patch column PR is selected from among the plurality of patch columns PR, the controller 50 performs the color measurement processes for patches in the selected patch column. That is, the controller performs the color measurement processes for patches in a target patch column among the plurality of patch columns while sequentially changing the target patch column one by one in an arrangement order of the plurality of patch columns in the arrangement direction. Accordingly, the color measurement processes for the prescribed first number of first patches in the one or more first patch columns are performed in the first interval. The color measurement processes for the prescribed second number of second patches in the one or more second patch columns are performed in the second interval. The color measurement processes for the prescribed third number of first patches in the one or more third patch columns are performed in the third interval.

Figure 18:
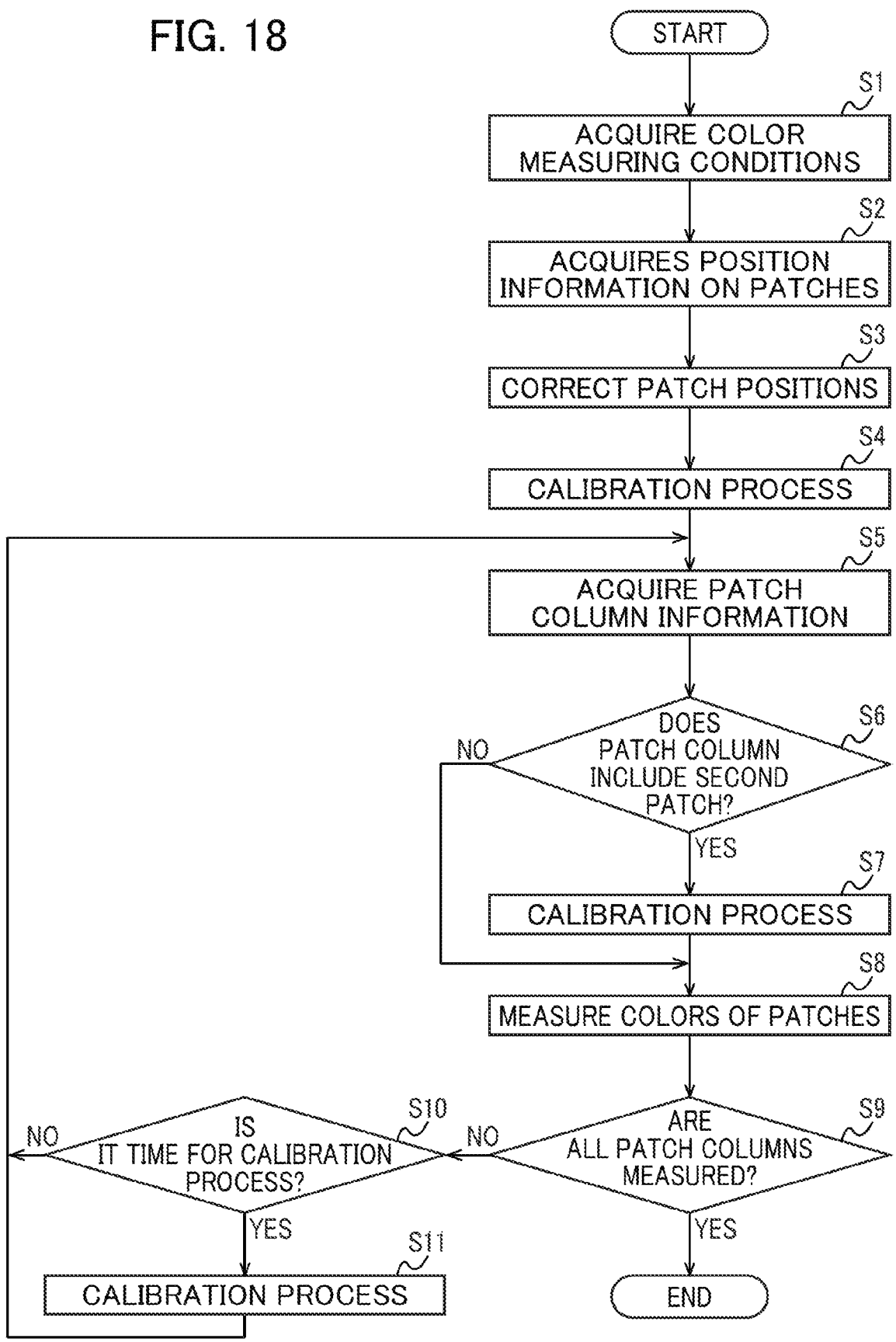
FIG. 18 is a flowchart showing a method of color measurement performed by a controller.

FIG. 18 is a flowchart showing one example of a method of color measurement performed by the controller 50 according to the present embodiment. The controller 50 performs the process shown in the flowchart of FIG. 18 in response to a user instruction to rewrite the table Ta. Prior to performing the process in FIG. 18, the controller 50 acquires patch creation conditions from the external device 200, input device 15, or the like. The patch creation conditions may include the size or type of print medium W on which the patches P are to be printed and the size of the patches P, for example. Subsequently, the controller 50 forms the first patches Pb in the patch chart PT on the basis of the above patch creation conditions. The controller 50 also forms one or more second patches Ps in the patch chart PT by acquiring color information corresponding to one or more user-specified positions in a preview image PI from image data for the preview image PI.

When printing the patch chart PT, the controller 50 registers in the patch column table Tp (FIG. 6) information specifying whether each patch column includes one or more second patches, the number of patches included in each patch column PR. The controller 50 may register in the patch column table Tp information specifying the number of first patches Pb included in each patch column PR and the number of second patches Ps included in each patch column PR.

As shown in FIG. 18, in S1 the controller 50 first acquires color measuring conditions, including the number of patches P in the patch chart PT, the type of the light-emitting element 211 in the color measuring unit 208, and the viewing angle of the observer, i.e., the user, from the external device 200, input device 15, or the like.

In S2 the controller 50 acquires position information on the first patches Pb and the second patches Ps. At this time, the controller 50 acquires position information on the second patches Ps from the external device 200, the input device 15, or the like for each patch column PR. The position information may be based on position data acquired in printing the patch chart PT. The controller 50 extracts the patch positions from the acquires position information.

In S3 the controller 50 performs a process to correct the patch positions. Specifically, the controller 50 specifies the first marker images Mi1 and the second marker images Mi2 printed on the print medium W by using the color measuring unit 208 and specifies the first patch area R1 and the second patch area R2 and positions of patches Ps and Pb in the patch areas R1 and R2 respectively. The controller 50 corrects the patch positions on the basis of the specified positions of the patches Ps and Pb. The controller 50 may updates the starting positions and the ending positions of the patch column PR in the patch column table Tp on the basis of the specified positions of the patches Ps and Pb.

In S3 the controller 50 may specify the position of each first patch Pb and each second patch Ps as follows. That is, the controller 50 acquires positions of at least three first marker images Mi1. The position of each of the at least three first marker images Mi1 is based on a position of the color measuring unit 208 opposing the each of the at least three first marker images Mi1. Further the controller 50 specifies a position of each first patch Ps on the basis of the positions of the at least three first marker images Mi1. The controller 50 also acquires positions of at least three second marker images Mi2 of the plurality of second marker images Mi2.

The position of each of the at least three second marker images Mis is based on a position of the color measuring unit 208 opposing the each of the at least three second marker images Mi2. The controller 50 specifies a position of each second patch Ps on the basis of the positions of the at least three second marker images Mi2. Here, the number of the at least three second marker images is greater than the number of the at least three first marker images.

In S4 the controller 50 calibrates the color measuring unit 208. At this time, the controller 50 performs a calibration process on the basis of the color measuring conditions acquired in S1. That is, the calibration process is performed before color measurements on patches in the patch chart PT starts.

In S5 the controller 50 selects a patch column among patch columns in the patch chart PT whose colors of patches P have not been measured. The controller 50 selects a patch column while giving priority to each patch column including the first patches Pb only over each patch column including one or more second patches Ps. Accordingly, the controller 50 selects a patch column including one or more second patches Ps, only after all the patch columns each including the first patches Pb only have been measured. The controller 50 may select each patch column PR so that the patch columns are selected beginning from the downmost patch column PR toward the upward one-by-one.

In S5 the controller 50 acquires patch column information from the patch column table Tp (FIG. 7) for the selected patch column PR indicating whether the patch column PR includes one or more second patches Ps. In S6 the controller 50 determines on the basis of the acquired patch column table Tp whether the patch column PR includes one or more second patches Ps. When the patch column PR includes one or more second patches Ps (S6: YES), in S7 the controller 50 performs a calibration process for the color measuring unit 208. In a case that the selected patch column includes a second patch Ps, in S7 the controller 50 performs the calibration process to calibrate the color measuring unit 208 by controlling the color measuring unit 208 to measure a color of the white reference 210. In a case that the prescribed second specific number is equal to the number of patches in one patch column for example, the calibration process is (automatically) performed each time a second specific number of the color measurement processes for the second patches is performed, through the processes of S6 and S7.

However, when the patch column PR includes no second patch Ps (S6: NO) or after completing the process in S7, in S8 the controller 50 controls the color measuring unit 208 to measure colors of patches in the selected patch column PR. That is, after the calibration process is completed, a color measurement process for each patch included in the patch column including the second patch. Here, the color measurement process for the patch is to control the color measuring unit 208 to measure a color of the patch.

In S9 the controller 50 determines whether color measurements have been completed for all patch columns PR in the patch chart PT. When color measurements have been completed for all patch columns PR (S9: YES), the controller 50 ends the process in FIG. 18. However, when color measurements have not been completed for all patch columns PR (S9: NO), in S10 the controller 50 determines whether it is time for a calibration process. Here, the controller 50 determines the timing of a calibration process by comparing information on the prescribed numbers of times (for example, prescribed first number of times or prescribed first specific number of times) stored in the storage unit 53 and color measurement instructions for the color measuring unit 208. When the controller 50 determines that it is time for a calibration process (S10: YES), in S11 the controller 50 performs a calibration process for the color measuring unit 208. Here, the time for a calibration process may be a time that the number of times of color measurements after the previous color calibration reaches the first specific number of times. That is, the calibration process is performed each time the first specific number of the color measurement processes for the first patches is performed. Here, the second specific number being less than the first specific number. Or, the time may be the time at which all the color measurements for the first patches Pb are completed and before color measurements for the second patches Ps starts.

However, when the controller 50 determines it is not time for calibration process (S10: NO) or after completing the process in S11, the controller 50 returns to S5 to select one of unselected patch columns PR in S5, and repeats the process S5-S11 for patches in the newly selected patch column PR.

According to the colorimetry system 100 of the first embodiment and the printing device 1A of the second embodiment described above, the color measuring unit 208 is calibrated prior to performing color measurements of second patches Ps in a patch column PR when the patch column PR including second patches Ps. This process improves the accuracy of color measurements for second patches Ps whose colors the user wishes to have calibrated, thereby improving the accuracy of color calibration, which leads to increased user satisfaction.

Further, variation in measured color values is large for a prescribed number of times immediately after each calibration process is completed. Therefore, the colorimetry system 100 and the printing device 1A in the above embodiments acquire, as the measured color values for the second patches Ps, results of color measurements performed in the prescribed second number of times following the prescribed first number of times after the timing that the color measuring unit 208 was calibrated. This method can suppress variation in the measured color values acquired for second patches Ps.

Further, the colorimetry system 100 and the printing device 1A in the above embodiments perform color measurements on the dummy patches Pd1 and Pd2 in the color measurement interval KD for the prescribed first number of times of color measurements following a calibration process. As a result, color measurements of second patches Ps can be performed in the color measurement interval KS (FIG. 12) for the prescribed second number of times of color measurements that follows the prescribed first number of times of color measurements after the timing that the color measuring unit 208 was calibrated.

The above embodiments can employ a patch chart PT (FIGS. 13 and 17) having first patches Pb of the prescribed first number in the first patch area R12, second patches Ps of the prescribed second number in the second patch area R21, and first patches Pb of the prescribed third number in the first patch area R22 that are arranged in this order in the arrangement direction Da. Here, the color measurements of: the prescribed first number of patches in the first patch area R12; the prescribed second number of patches in the second patch area R21, and the prescribed third number of patches in the first patch area R12 are performed in this order. That is, color measurements with the color measuring unit 208 are performed in sequence in the arrangement direction Da. This eliminates the need to form separate dummy patches as targets of color measurements in the color measurement interval KD for the prescribed first number of color measurements following a calibration process.

In the above embodiments, the color measuring unit 208 is calibrated each time the first specific number of color measurements is completed while continuously measuring the colors of first patches Pb, and the color measuring unit 208 is again calibrated each time the second specific number of color measurements smaller than the first specific number has been performed while continuously measuring the colors of second patches Ps. As a result, the frequency of calibration processes for color measurements of second patches Ps is higher than the frequency of calibration processes for color measurements of first patches Pb, thereby improving the reliability of measured color values for the second patches Ps.

In the above embodiments, more second marker positions is acquired than first marker positions. In this way, more suitable position information can be acquired on second patches Ps, for which color measurements of relatively high accuracy is desired.

In the above embodiments, the controller 50 determines whether each patch column PR includes second patches Ps based on the patch column table Tp. This enables the controller 50 to quickly and easily determines whether the patch column PR includes second patches Ps.

VARIATIONS

Figure 19:
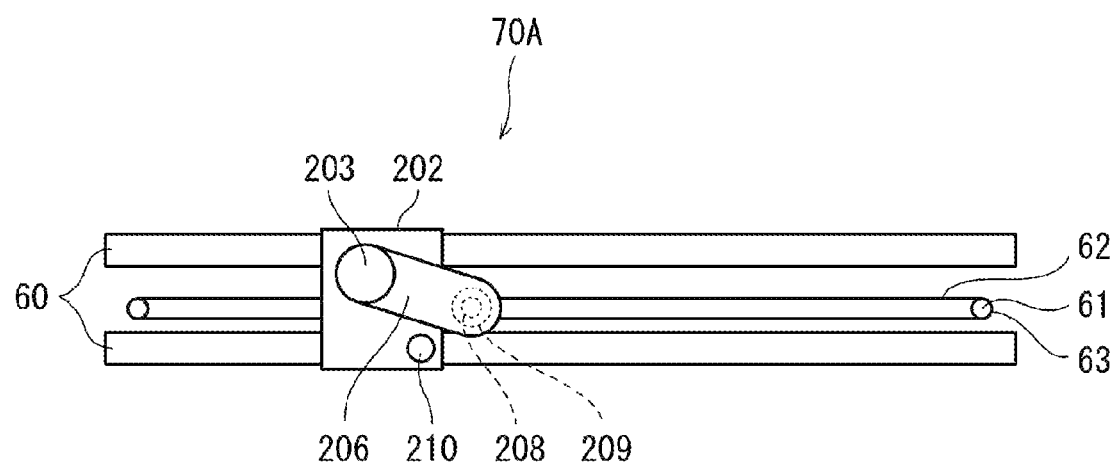
FIG. 19 is a plan view showing a colorimetric device.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

While the colorimetric device 70 in FIG. 14 employs an arm 204 having two links (the first link 205 and second link 206), the colorimetric device is not limited to this configuration. FIG. 19 shows a colorimetric device 70A as a variation of the colorimetric device 70 in FIG. 14. As shown in FIG. 19, the colorimetric device 70A has just the second link 206. This configuration can reduce the number of components being controlled compared to the colorimetric device 70 of FIG. 14.

In the above embodiments, the color measuring unit 208 is calibrated prior to measuring colors of patches P in a patch column PR (i.e., second patches Ps only, or both first patches Pb and second patches Ps in the mixed patch column PRc) when the patch column PR includes one or more second patches Ps. However, the color measuring unit 208 may be calibrated before performing color measurements, even when the patch column PR includes only first patches Pb.

In the above embodiments, color measurements are performed on dummy patches Pd1 and Pd2 in the color measurement interval KD for the prescribed first number of times following the calibration process at timing N3 (color measurements up to timing N4). However, the target of color measurements in the color measurement interval KD is not limited to dummy patches but may be any patches other than second patches Ps. Thus, in this case color measurements may be performed on first patches Pb.

While an inkjet printer is offered as an example of the printing devices 1 and 1A in the embodiments described above, the printing devices 1 and 1A may be another printer, such as a laser printer or a thermal printer. A laser printer is provided with a printing member. The printing member of a direct tandem laser printer includes an image carrier such as a photosensitive drum or a photosensitive belt, a charging unit that charges the image carrier through contact or non-contact, an exposure unit that forms an electrostatic latent image on the charged image carrier using a laser semiconductor or the like (known as "exposure"), a toner cartridge or developing cartridge that supplies toner to the image carrier on which an electrostatic latent image has been formed, a transfer unit such as a transfer roller or transfer belt that transfers the developed toner image from the image carrier directly to a print medium, and a fixing unit such as a fixing roller or belt that thermally fixes the toner transferred onto the print medium. The laser printer is not limited to a direct tandem laser printer but may be an intermediate transfer laser printer. The intermediate transfer laser printer first transfers the developed toner image from the image carrier onto an intermediate transfer belt before using the transfer unit to transfer the toner image from the intermediate transfer belt onto the print medium. A thermal printer is also provided with a printing member. The printing member of the thermal printer includes a thermal head, and an ink ribbon. The thermal head contacts the ink ribbon and transfers ink in the ink ribbon onto a print medium by generating heat in selective heating elements.

Further, while the printing devices 1 and 1A are serial printers in the embodiments described above, the printing devices 1 and 1A may be line printers, for example.

While the colorimetric device 70 is provided with a plurality of links in the above embodiments, the colorimetric device may simply be provided with the prismatic joint 209 on the base 202, without the links. In this case, the color measuring unit 208 is moved in the moving direction Ds by the base 202 and is moved vertically by the linear actuator 81 of the prismatic joint 209.

In the first embodiment, the CPU 303 acquires position information on each second patch Ps in the patch chart PT based on information acquired for three second marker positions, but the invention is not limited to this method. The CPU 303 may acquire position information on second patches Ps in the patch chart PT based on information acquired for both the first marker positions and second marker positions.

In the above embodiments, the controller 50 performs the process according to the flowchart of FIG. 18 in response to a user instruction to rewrite the table Ta. However, the controller 50 may perform the process in FIG. 18 each time a print job is received. That is, the process in FIG. 16 may be performed without the user instruction. When the controller 50 performs the process in FIG. 18 upon reception of a print job, the controller 50 begins printing on a print medium W on the basis of the print job after color measurements are completed for all patch columns PR (S9: YES) and color calibration for printing is performed on the basis of the results of color measurements. Once printing on the print medium W is completed, the controller 50 may end the process of FIG. 18.

In the patch chart PT of the embodiments described above, a patch Pd1 (FIGS. 4, 16), referred to as a dummy patch, is arranged on the upstream side of the second patch area R2 in the color measuring direction Dm or patches Pd2 (FIG. 5), also referred to as dummy patches, are arranged in the mixed patch column PRc, but the arrangement of dummy patches is not limited to these cases. For example, in the example shown in FIG. 4, a dummy patch may be arranged in the patch chart PT on the downstream side of the second patch area R2 in the color measuring direction Dm. In the example shown in FIG. 16, a dummy patch may be arranged in the patch chart PT on the upstream side of the second patch area R2 in the conveying direction Df. Alternatively, a dummy patch may be arranged outside both the first patch area R1 and second patch area R2.

What is claimed is:

1. A printing device comprising:
a print head configured to print a patch chart on a print medium, the patch chart including a plurality of patches including a plurality of first patches, each first patch having a respective one of predetermined colors;
a measuring member configured to measure a color of a patch; and
a controller configured to perform:
printing the patch chart including a plurality of patch columns, in each patch column two or more patches among the plurality of patches being arranged linearly,
determining whether a patch column of the plurality of patch columns includes one or more second patches, each second patch having a respective one of one or more user specified colors; and
in a case that a patch column of the plurality of patch columns includes one or more second patches:
a calibration process to calibrate the measuring member by controlling the measuring member to measure a color of a reference; and
after the calibration process is completed, a color measurement process to control the measuring member to measure a color of each of the one or more second patches included in the patch column.

2. The printing device according to claim 1, wherein after the completion of the calibration process, the color measurement process is performed a prescribed first number of times in a first time interval and thereafter a prescribed second number of times in a second time interval, the prescribed first number of times being smaller than the prescribed second number of times, the first time interval being shorter than the second time interval,
wherein each color measurement process performed in both the first time interval and the second time interval measures a color of a respective one of patches included in the patch column that is determined to include the one or more second patches,
wherein at least one color measurement process performed in the second time interval measures a color of a second patch in the patch column that is determined to include the one or more second patches.

3. The printing device according to claim 2, wherein the patch column extends in an extending direction, the two or more patches in the patch column being arranged in the extending direction, the two or more patches in the patch column including an upstream end patch at an upstream end in the extending direction,
herein the color measurement processes are performed for the patches in the patch column one by one in an arrangement order of the patches in the extending direction from the upstream end patch,
wherein the color measurement process for the upstream end patch is performed in the first time interval.

4. The printing device according to claim 2, wherein the plurality of patch columns includes a mixed patch column, the mixed patch column including one of the plurality of first patches and a different patch different from any one of the one or more second patches,
wherein the color measurement process for the different patch is performed in the first time interval.

5. The printing device according to claim 2, wherein after the second time interval, the color measurement process is performed a prescribed third number of times in a third interval,
wherein the plurality of patch columns includes one or more first patch columns, one or more second patch columns, and one or more third patch columns arranged in this order in an arrangement direction, the one or more first patch columns including the prescribed first number of first patches, the one or more second patch columns including the prescribed second number of second patches, the one or more third patch columns including the prescribed third number of first patches,
wherein the controller performs the color measurement processes for patches in a target patch column among the plurality of patch columns while sequentially changing the target patch column one by one in an arrangement order of the plurality of patch columns in the arrangement direction, the color measurement processes for the prescribed first number of first patches in the one or more first patch columns being performed in the first time interval, the color measurement processes for the prescribed second number of second patches in the one or more second patch columns being performed in the second time interval, and the color measurement processes for the prescribed third number of first patches in the one or more third patch columns being performed in the third interval.

6. The printing device according to claim 1, wherein the calibration process is performed each time a first specific number of the color measurement processes for the first patches is performed,
wherein the calibration process is performed each time a second specific number of the color measurement processes for the second patches is performed, the second specific number being smaller than the first specific number.

7. The printing device according to claim 1, wherein the patch chart has an entire patch area having a first patch area and a second patch area different from the first patch area, in the first patch area the plurality of first patches being arranged, in the second patch area the one or more second patches being arranged,
wherein the patch chart further includes a plurality of first marker images arranged at positions surrounding or within the entire patch area,
wherein the patch chart further includes a plurality of second marker images, each second marker image being arranged at a position surrounding or within the second patch area in the patch chart,
wherein the controller is configured to further perform:
acquiring positions of at least three first marker images of the plurality of first marker images, the position of each of the at least three first marker images being based on a position of the measuring member opposing the each of the at least three first marker images;
specifying a position of each first patch on the basis of the positions of the at least three first marker images;

acquiring positions of at least three second marker images of the plurality of second marker images, the position of each of the at least three second marker images being based on a position of the measuring member opposing the each of the at least three second marker images; and specifying a position of each second patch on the basis of the positions of the at least three second marker images, wherein the number of the at least three second marker images is greater than the number of the at least three first marker images.

8. The printing device according to claim 1, wherein the controller is configured to further perform:

generating a patch column table including information specifying whether each patch column includes one of the one or more second patches and information on the number of second patches included in the each patch column; and determining on the basis of the patch column table whether the patch column includes one of the one or more second patches.

9. A method for measuring colors of a plurality of patches included in a patch chart, the plurality of patches including a plurality of first patches, each first patch having a respective one of predetermined colors, the patch chart including a plurality of patch columns, in each patch column two or more patches among the plurality of patches being arranged linearly, the method comprising:

determining whether a patch column of the plurality of patch columns includes one or more second patches, each second patch having a respective one of one or more user specified colors; and in a case that a patch column of the plurality of patch columns includes one or more second patches:

performing a calibration process to calibrate the measuring member by controlling the measuring member to measure a color of a reference; and performing, after the calibration process is completed, a color measurement process to measure a color of each of the one or more second patches included in the patch column.

10. A non-transitory computer readable storage medium storing a set of program instructions for a computer controlling a measuring member configured to measure colors of a patch chart including a plurality of patches including a plurality of first patches, each first patch having a respective one of predetermined colors, the patch chart including a plurality of patch columns, in each patch column two or more patches among the plurality of patches being arranged linearly, the set of program instructions, when executed by the computer, causing an image reading apparatus to perform:

determining whether a patch column of the plurality of patch columns includes one or more second patches, each second patch having a respective one of one or more user specified colors; and in a case that a patch column of the plurality of patch columns includes one or more second patches:

a calibration process to calibrate the measuring member by controlling the measuring member to measure a color of a reference; and after the calibration process is completed, a color measurement process to measure a color of each of the one or more second patches included in the patch column.

* * * * *

UNITED STATES PATENT AND TRADEMARK OFFICE
CERTIFICATE OF CORRECTION

| | | |
|---|---|---|
| PATENT NO. | : 12,177,409 B2 | Page 1 of 1 |
| APPLICATION NO. | : 18/357267 | |
| DATED | : December 24, 2024 | |
| INVENTOR(S) | : Shota Morikawa | |

It is certified that error appears in the above-identified patent and that said Letters Patent is hereby corrected as shown below:

On the Title Page

Insert:
-- (30) Foreign Application Priority Data
July 29, 2022 (JP) ..............................2022-121576 --

Signed and Sealed this
Thirtieth Day of September, 2025

John A. Squires
*Director of the United States Patent and Trademark Office*